(12) United States Patent
Nomani et al.

(10) Patent No.: US 12,413,429 B2
(45) Date of Patent: Sep. 9, 2025

(54) SYSTEMS AND METHODS FOR GROUP MESSAGING USING BLOCKCHAIN-BASED SECURE KEY EXCHANGE WITH KEY ESCROW FALLBACK

(71) Applicant: Verizon Patent and Licensing Inc., Basking Ridge, NJ (US)

(72) Inventors: Muhammad Salman Nomani, Hillsborough, NJ (US); John M. Stokes, Yorba Linda, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 554 days.

(21) Appl. No.: 17/809,047

(22) Filed: Jun. 27, 2022

(65) Prior Publication Data

US 2022/0368546 A1    Nov. 17, 2022

Related U.S. Application Data

(63) Continuation-in-part of application No. 17/321,378, filed on May 14, 2021, now Pat. No. 11,849,032.

(51) Int. Cl.
*H04L 9/40* (2022.01)
*H04L 9/00* (2022.01)
(Continued)

(52) U.S. Cl.
CPC .............. *H04L 9/50* (2022.05); *H04L 9/0819* (2013.01); *H04L 9/0894* (2013.01); *H04L 51/04* (2013.01); *H04L 51/21* (2022.05)

(58) Field of Classification Search
CPC ....... H04L 9/50; H04L 9/0819; H04L 9/0894; H04L 51/04; H04L 51/21; H04L 63/0442;
(Continued)

(56) References Cited

U.S. PATENT DOCUMENTS 10,735,193 B1 *  8/2020  Knas ..................... H04L 9/3239
10,999,260 B1     5/2021  Silvestri et al.
(Continued)

FOREIGN PATENT DOCUMENTS

CN        111934889 A  * 11/2020

OTHER PUBLICATIONS

"Key escrow", Wikipedia, Nov. 20, 2020 (available at https://en.wikipedia.org/w/index.php?title=Key_excrow&oldid=989705940, visited Apr. 23, 2021).
(Continued)

*Primary Examiner* — Carl G Colin
*Assistant Examiner* — Andrew Suh

(57) ABSTRACT

A system described herein may provide for secure group messaging between multiple participant devices, in which two or more of the participant devices support blockchain-based techniques for the secure sharing of keys used to secure the group messaging, and in which one or more of the participant devices (e.g., a third device) do not support such techniques. A key escrow system may maintain keys associated with the third device, and the other devices of the group messaging system may retrieve such keys from the key escrow system. Such other devices may attempt to obtain keys associated with the third device from a blockchain and may retrieve such keys from the key escrow system when the retrieval from the blockchain is unsuccessful. The other devices may additionally share their respective keys to the blockchain and the key escrow system, or the key escrow system may "pull" such keys from the blockchain.

20 Claims, 20 Drawing Sheets

(51) Int. Cl.
  *H04L 9/08* (2006.01)
  *H04L 9/32* (2006.01)
  *H04L 51/04* (2022.01)
  *H04L 51/21* (2022.01)
  *H04L 51/212* (2022.01)

(58) Field of Classification Search
  CPC ... H04L 63/061; H04L 63/12; H04L 2209/80; H04L 9/0841; H04L 9/3263; H04L 51/212
  See application file for complete search history.

(56) References Cited

U.S. PATENT DOCUMENTS

| | | | |
|---|---|---|---|
| 11,258,593 B1* | 2/2022 | Cox | H04L 9/0637 |
| 11,423,474 B1 | 8/2022 | Ribeiro | |
| 2017/0048066 A1* | 2/2017 | De Atley | H04L 63/0442 |
| 2018/0032383 A1* | 2/2018 | Surcouf | H04L 9/3239 |
| 2019/0268312 A1 | 8/2019 | Ma et al. | |
| 2019/0372762 A1* | 12/2019 | Shainski | G06F 16/1824 |
| 2020/0252202 A1* | 8/2020 | Madl | H04L 63/12 |
| 2021/0110049 A1* | 4/2021 | Kumar | H04L 9/0825 |
| 2022/0103356 A1* | 3/2022 | Be'ery | H04L 9/50 |
| 2022/0107994 A1 | 4/2022 | Bernardi | |
| 2022/0166616 A1* | 5/2022 | Manevich | H04L 9/0891 |
| 2022/0271957 A1* | 8/2022 | Zamani | H04L 9/3239 |
| 2022/0294611 A1 | 9/2022 | Katsumata et al. | |
| 2023/0021047 A1* | 1/2023 | Ammar | H04L 9/0847 |

OTHER PUBLICATIONS

Maheshwari, "Learn step-by-step how to set up a basic blockchain network", Think 2021: The premier hybrid cloud and AI event, Jul. 10, 2020 (available at https://developer.ibm.com/technologies/blockchain/tutorials/quick-start-guide-for-ibm-blockchain-plalform/, visited May 7, 2021).

Perrin, et al., "The Double Ratchet Algorithm", Signal, Nov. 20, 2016 (available at https://signal.org/docs/specifications/doubleratchet/, visited Apr. 23, 2021).

* cited by examiner

SYSTEMS AND METHODS FOR GROUP MESSAGING USING BLOCKCHAIN-BASED SECURE KEY EXCHANGE WITH KEY ESCROW FALLBACK

CROSS-REFERENCE TO RELATED APPLICATION

This Application is a Continuation-in-Part of U.S. patent application Ser. No. 17/321,378 filed on May 14, 2021, titled "SYSTEMS AND METHODS FOR BLOCKCHAIN-BASED SECURE KEY EXCHANGE," the contents of which are herein incorporated by reference in their entirety.

BACKGROUND

Some encryption techniques, such as Public Key Infrastructure ("PKI") techniques, may make use of public keys, which may be used to encrypt messages that may be decrypted using an associated private key, and/or may be used in other techniques. Public keys may be distributed or stored by key escrow systems, which may provide a single point of failure and/or an opportunity for a "man-in-the-middle" attack, via which public key may be obtained, modified, and/or otherwise compromised.

DETAILED DESCRIPTION OF EXAMPLE EMBODIMENTS

The following detailed description refers to the accompanying drawings. The same reference numbers in different drawings may identify the same or similar elements.

Embodiments described herein provide for the secure maintaining and providing of information, such as public keys used in PKI techniques or other techniques, using a secure distributed ledger (e.g., "blockchain") system. For example, embodiments described herein may utilize a blockchain system in lieu of a key escrow system in the exchange and/or providing of public keys in a Diffie-Hellman key exchange technique or other type of technique in which public keys are provided from one entity to another. For example, as discussed herein, a first entity may generate an asymmetric key pair that includes a public key and a private key, and may provide the public key to a blockchain system for retrieval by one or more other entities. For example, the entities may be engaged in a secure messaging session, in which messages are encrypted and may be decrypted using one or more keys, including the public key. For example, the messaging session may be associated with multiple key derivation functions, in which a first key or set of keys (e.g., "root" keys) are used in the generation of one or more other keys (e.g., "send" keys and/or "receive" keys). A root key derivation function, for example, may be performed by first and second entities engaged in the communication session to generate respective send and/or receive keys for each entity. The entities may make use of different private keys in their respective root derivation functions, but may utilize one or more shared public keys for their respective root derivation functions. Examples of techniques that make use of multiple key derivation functions, including a root derivation function utilizing one or more shared public keys, include a "double ratchet" encryption technique, a "Signal Protocol," and/or other types of techniques.

In some embodiments, the contents of the secured ledger system (e.g., blockchain) may be publicly available or accessible, but the information stored therein may have no meaning or use to an attacker or other malicious user, in the context of obtaining public keys associated with PKI techniques or other techniques. In some embodiments, a private blockchain may be used, in which only authorized entities are able to access the information stored in the private blockchain. Further, as records stored in a blockchain system are immutable, an attacker may be prevented from modifying public keys and thereby potentially having access to information encrypted based on such keys. For simplicity, embodiments described herein are described in the context of the secured ledger system being a blockchain system. However, similar concepts may apply to another type of secured ledger system other than a blockchain system.

Figure 1:
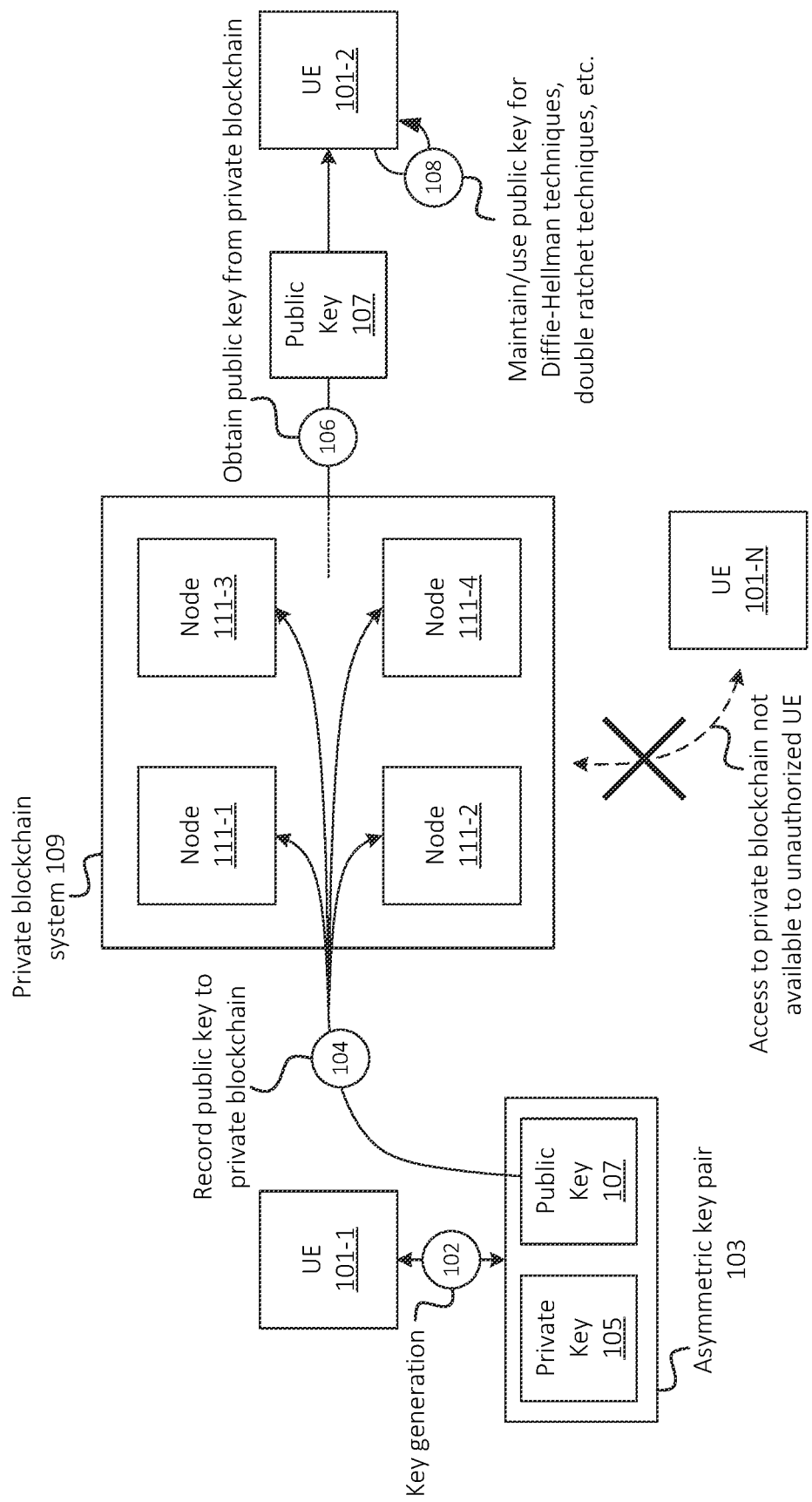
FIG. 1 illustrates an example overview of one or more embodiments described herein.

As shown in FIG. 1, a first entity, such as User Equipment ("UE") 101-1, may generate (at 102) a set of keys. The set of keys may be, and/or may include, asymmetric key pair 103, which may include private key 105 and public key 107. Private key 105 may be used to decrypt information encrypted by public key 107, may be used in a double ratchet and/or Signal Protocol technique, and/or may be used for other suitable purposes. UE 101-1 may securely store private key 105, such as in a local storage device associated with UE 101-1, in a private key store, in a Universal Integrated Circuit Card ("UICC"), and/or in some other secure location.

As further shown, UE 101-1 may record (at 104) the public key to a blockchain system, such as private blockchain system 109. As noted above, private blockchain system 109 may be "private," in that only authorized entities (e.g., authorized UEs, authorized users, etc.) may have access to the information stored in private blockchain system 109. The information stored in private blockchain system 109 may be organized as "blocks," where one particular record corresponds to one particular block, and/or where one block includes multiple records. A block may also include a reference to one or more other blocks (e.g., a "previous" block and/or a "next" block), such that a group of blocks and their associated references may form a "chain" of blocks. Further, private blockchain system 109 may include a set of nodes 111 that form a consensus regarding the blocks of which the blockchain is comprised, thus preventing unauthorized changes to the information stored in the blockchain, as well as resiliency in case any particular node 111 is compromised or otherwise becomes unavailable. In some embodiments, nodes 111 may each be implemented by a respective UE 101, such as a mobile telephone, a workstation computer, a tablet, an Internet of Things ("IoT") device, and/or other suitable type of device. While shown in the figure as being "external" to private blockchain system 109, in practice, UE 101-1 may be, and/or may implement, a particular node 111 associated with private blockchain system 109.

When recording the public key to private blockchain system 109, UE 101-1 may provide an identifier associated with UE 101-1 and/or other identifying information based on which the public key may be retrieved by an entity that may use the public key. For example, the record may include an Internet Protocol ("IP") address associated with UE 101-1, a device name, a user name, a Session Initiation Protocol ("SIP") address, and/or some other suitable information associated with UE 101-1.

Additionally, or alternatively, the record may include a session identifier, which may identify a communication session between UE 101-1 and another UE, such as UE 101-2. For example, UE 101-1 and UE 101-2 may be engaged in a secure messaging session, in which UE 101-1 and UE 101-2 exchange encrypted messages. The messaging session may be associated with a double ratchet technique, a Signal Protocol technique, and/or other type of technique in which UE 101-1 and UE 101-2 provide public keys to each other.

Briefly, for example, for each message sent between UE 101-1 and UE 101-2, a new public key may be generated (e.g., in an alternating fashion, where UE 101-1 generates a public key for a first message, UE 101-2 generates a public key for a second message, UE 101-1 generates a public key for a third message, and so on). As described below, these alternating shared public keys may serve as a first "ratchet" in a double ratchet technique to ensure security of the encrypted communications. For example, as discussed below, the public keys may be used to generate symmetric send and/or receive keys, which may be used to encrypt and/or decrypt communications between UE 101-1 and UE 101-2 without transmitting the send and/or receive keys between each other.

Private blockchain system 109 is illustrated as including four nodes 111-1, 111-2, 111-3, and 111-4. In practice, private blockchain system 109 may include fewer nodes and/or additional nodes. Private blockchain system 109 may, in some embodiments, be associated with one or more suitable authentication mechanisms whereby only authorized devices or systems are able to participate as nodes 111 of private blockchain system 109. For example, as discussed herein, particular users or UEs 101 may be specified or automatically identified (e.g., based on an address book or contact list associated with a particular UE 101 that is authorized to access private blockchain system 109 and/or some other suitable technique). As such, unauthorized devices, such as UE 101-N, may not be able to access information stored in private blockchain system 109 and/or may not be able to participate as a node 111 of private blockchain system 109. Further, as the nodes 111 of private blockchain system 109 may only include trusted devices, the integrity of the information stored by private blockchain system 109 may be enhanced, as the likelihood of a compromise or attack of private blockchain system 109 may be reduced or eliminated. Further, the recording and/or accessing of private blockchain system 109 may be private with respect to external devices that do not have access to private blockchain system 109.

In some embodiments, separate private blockchain systems 109 may be established for discrete groups, such as messaging or conversation groups (e.g., where a first communication session includes a first set of participants and is associated with a first private blockchain system 109, and where a second communication session includes a second set of participants and is associated with a second private blockchain system 109). In some embodiments, a single private blockchain system 109 may be associated with multiple communication sessions, where keys associated with a given communication session may be protected by a set of smart contracts or other security mechanisms that are accessible only to participants in the communication session.

Once recorded to private blockchain system 109, public key 107 may be obtained (at 106) by UE 101-2 and/or another device or system to which the information stored in private blockchain system 109 is available. For example, as noted above, UE 101-2 may be a UE with which UE 101-1 is engaged in a communication session via which UE 101-1 and UE 101-2 exchange encrypted communications. UE 101-2 may identify a record stored in private blockchain system 109 that includes the identifier associated with UE 101-1, a communication session associated with UE 101-1 and UE 101-2, and/or some other suitable identifier. In some embodiments, UE 101-2 may be a node 111 of private blockchain system 109, and may maintain a full copy of the blockchain stored by private blockchain system 109. In some embodiments, private blockchain system 109 may implement or be communicatively coupled to a search system, which may provide records that match a query. For example, UE 101-2 may query private blockchain system 109 for the identifier associated with UE 101-1 and/or a communication session with UE 101-1, and private blockchain system 109 may return one or more blocks that include the identifier associated with UE 101-1 and/or the communication session. In some embodiments, private blockchain system 109 may return, and/or UE 101-2 may otherwise identify, the latest (e.g., most current) block matching the query. In this manner, in situations where UE 101-1 has provided multiple public keys to private blockchain system 109 over time, UE 101-2 may be able to retrieve and/or otherwise identify the newest public key. Identifying the newest public key may be useful in a double ratchet technique, a Signal Protocol technique, and/or some other technique in which an updated public key is used for each message between UE 101-1 and UE 101-2. In some embodiments, public keys may be provided with sequence numbers or other information, based on which public keys associated with communications received in a non-sequential manner (e.g., out of order) may be identified.

In some embodiments, the public key may be provided as part of a Diffie-Hellman exchange or some other suitable technique in which public keys associated with multiple UEs 101 are exchanged amongst each other. UE 101-2 may accordingly maintain and/or use (at 108) the received public key for a double ratchet technique, a Signal Protocol technique, and/or in some other technique that involves a Diffie-Hellman key exchange or other type of key exchange procedure.

Figure 2:
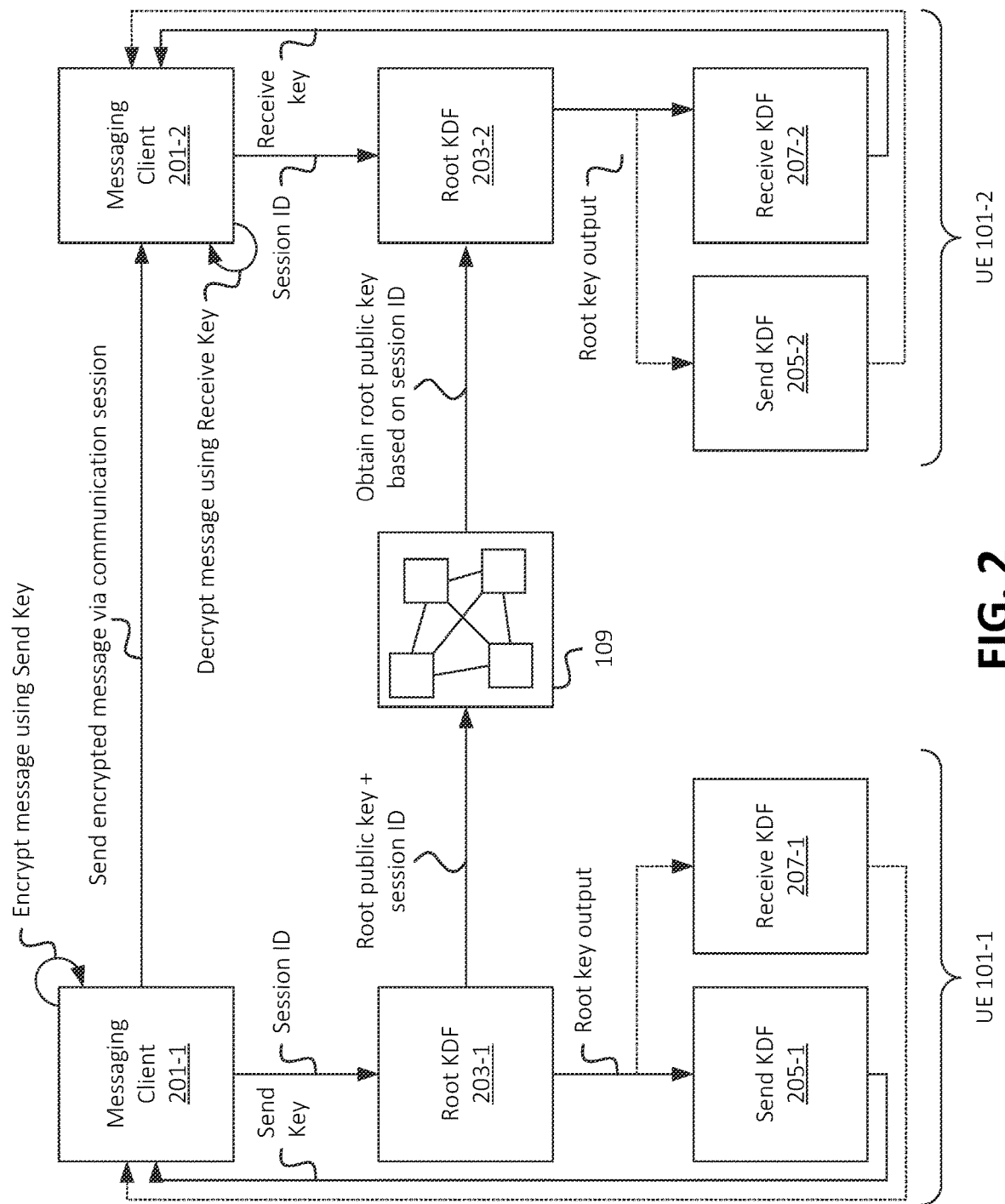
FIG. 2 illustrates an example of using a shared public key via a private blockchain system, in accordance with some embodiments, in a communication that utilizes double ratchet techniques to secure communications.

FIG. 2 illustrates an example of using a shared public key (e.g., shared via private blockchain system 109, in accordance with some embodiments) in a communication technique that utilizes double ratchet techniques to secure communications between UE 101-1 and UE 101-2. As shown, UE 101-1 and UE 101-2 may each include a respective messaging client 201, which may send and/or receive encrypted communications. For example, messaging client 201-1, associated with UE 101-1, may encrypt communications based on techniques described herein, and may send the encrypted communications to messaging client 201-2 associated with UE 101-2. Messaging client 201-2 may receive encrypted communications from UE 101-1 (e.g., from messaging client 201-1), may decrypt the communications based on techniques described herein, and may present the decrypted communications (e.g., via a graphical user interface ("GUI") or other suitable manner of presentation). Similarly, messaging client 201-2, associated with UE 101-2, may encrypt communications based on techniques described herein, and may send the encrypted communications to messaging client 201-1 associated with UE 101-1. Messaging client 201-1 may receive encrypted communications from UE 101-2 (e.g., from messaging client 201-2), may decrypt the communications based on techniques described herein, and may present the decrypted communications (e.g., via a GUI or other suitable manner of presentation).

The encryption and/or decryption by messaging client 201-1 and/or messaging client 201-2 may be performed using a symmetric key that is generated based on a double ratchet technique, a Signal Protocol technique, and/or other suitable technique. For example, as discussed herein, the symmetric key may be used by a sender (e.g., UE 101-1, in this example) to encrypt a communication, and may be used by a recipient (e.g., UE 101-2, in this example) to decrypt the communication. The symmetric keys may be generated by respective Send Key Derivation Function ("KDF") 205 and/or Receive KDF 207 associated with the sender and/or recipient. The symmetric keys may be generated based on one or more root keys provided by Root KDF 203 to Send KDF 205 and/or Receive KDF 207. For example, Root KDF 203-1 may provide a root key output based on a public key and a private key to Send KDF 205-1, which may generate a send key (e.g., based on the root key output and one or more private keys)s which may be used to encrypt communications to be sent by messaging client 201-1. The private key based on which the root key output is generated may be privately maintained by UE 101-1 (e.g., not sent to UE 101-2), while the public key may be shared with UE 101-2 via private blockchain system 109, in accordance with embodiments described herein. Root KDF 203-1 may provide a different root key output for each message sent and/or received by messaging client 201-1, based on a public key exchange (e.g., via a Diffie-Hellman key exchange or other suitable procedure) with UE 101-2, which may be performed each time a message is sent by UE 101-1 and/or UE 101-2.

For example, when UE 101-1 sends a message, Root KDF 203-1 may generate a root key output, and may further output a public key based on which the root key output was generated, to private blockchain system 109. As discussed above, the public key may be provided with a session identifier (e.g., to identify a communication session between messaging client 201-1 and messaging client 201-2), an identifier associated with UE 101-1, an identifier associated with UE 101-2, and/or other suitable information based on which UE 101-2 may identify that the public key recorded to private blockchain system 109 is associated with the communication session between UE 101-1 and UE 101-2.

UE 101-2 (e.g., Root KDF 203-2) may obtain the root public key from private blockchain system 109 based on the session identifier or other suitable identifier, and may generate a root key output based on the obtained public key and a private key (e.g., a different private key than the private key used by Root KDF 203-1 to encrypt the communication). As noted above, using private blockchain system 109 to exchange public keys may maintain the integrity of the keys, such as by preventing malicious actors from modifying or "spoofing" keys. Further, using private blockchain system 109 may aid in situations where a given UE 101 (e.g., UE 101-2, in this example) is "offline" or is otherwise unavailable to receive public keys from another UE 101 (e.g., UE 101-1, in this example) at the time that the other UE 101 outputs the public keys.

Root KDF 203-2 may provide the root key output to Receive KDF 207-2, which may generate a receive key based on the root key output and one or more private keys. In accordance with the double ratchet techniques, Signal Protocol techniques, etc., the receive key generated by Receive KDF 207-2 may be the same as the send key output generated by Send KDF 205-1. In this manner, these respective send and receive keys may be an identical symmetric key that may be used to encrypt and decrypt communications, such as the encrypted communication sent by messaging client 201-1 to messaging client 201-2 in this example.

While an example is provided here in the context of UE 101-1 encrypting a communication, sending the encrypted communication to UE 101-2, and UE 101-2 decrypting the communication, similar techniques may be performed (e.g., iteratively) for communications encrypted and sent by UE 101-2 to UE 101-1, as denoted by the dashed lines in FIG. 2. For example, Root KDF 203-2 may generate a root key pair, output a public key of the root key pair to private blockchain system 109 for retrieval by UE 101-1, generate a root key output based on the root key pair, and provide the root key output to Send KDF 205-2. Send KDF 205-2 may generate a send key based on the root key output and one or more private keys, and messaging client 201-2 may encrypt a communication based on the send key. Further, Root KDF 203-1 may retrieve the public key from private blockchain system 109, generate a root key output based on the retrieved public key and one or more private keys, and provide the root key output to Receive KDF 207-1. Receive KDF 207-1 may generate a receive key based on the root key output and one or more private keys, and messaging client 201-1 may decrypt a communication received from messaging client 201-2, as encrypted based on a matching send key.

Figure 3:
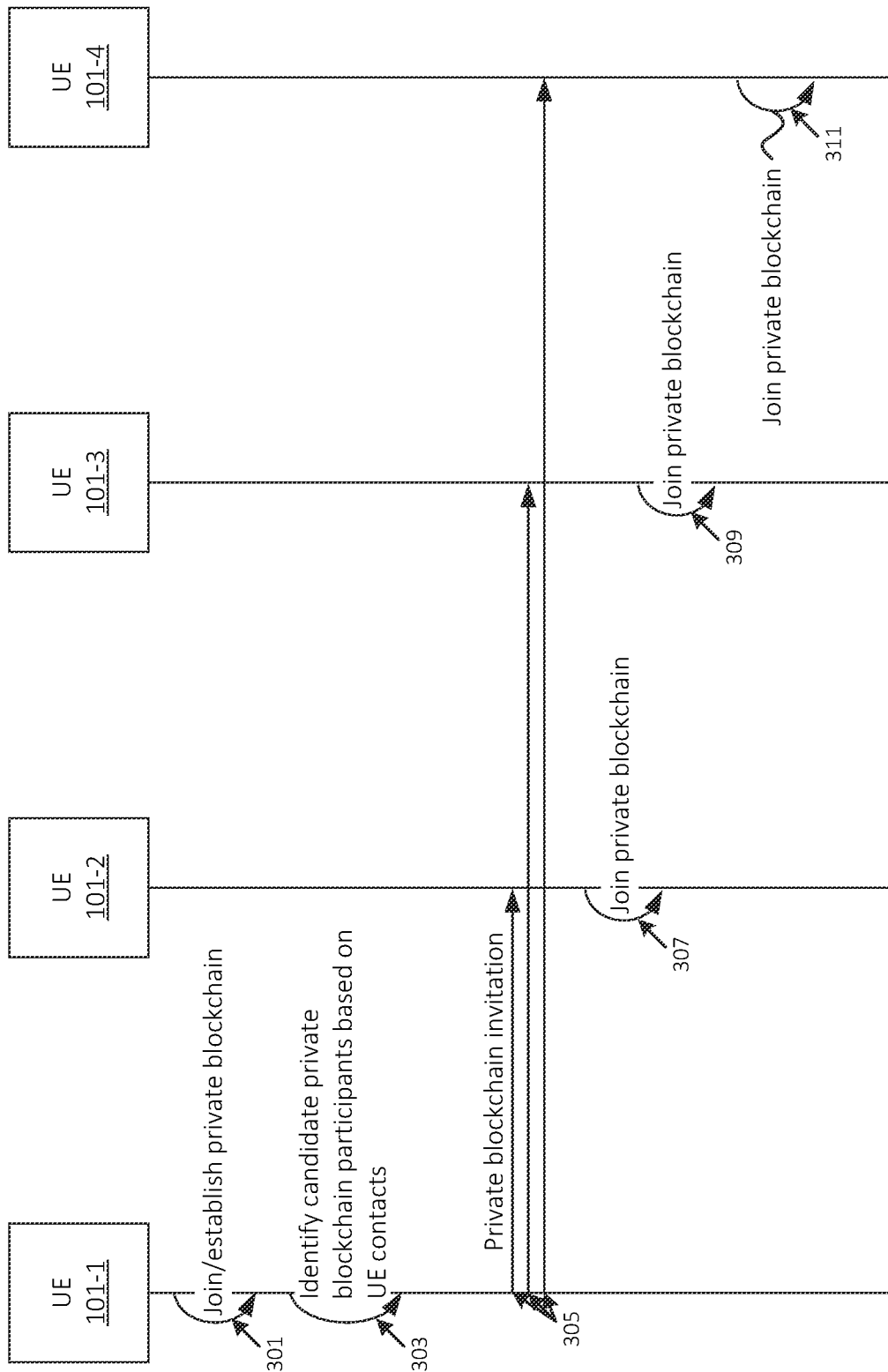
FIG. 3 illustrates an example of establishing a private blockchain system, in accordance with one or more embodiments.

As noted above, private blockchain system 109 may be a "private" blockchain, in that only approved UEs 101 (or other suitable devices or systems) may participate in private blockchain system 109 as nodes 111 of private blockchain system 109. In some embodiments, eligible participants may be identified based on an automated determination of contacts associated with one or more participant nodes 111 of private blockchain system 109, and/or some other suitable technique. For example, as shown in FIG. 3, UE 101-1 may establish (at 301) and/or join private blockchain system 109. For example, UE 101-1 may establish a new private blockchain system 109 by generating a "genesis" block, and/or may join an existing private blockchain system 109. In some embodiments, UE 101-1 may communicate with one or more devices or systems that facilitate the establishment of private blockchain system 109.

UE 101-1 may further automatically identify (at 303) candidate participants (e.g., nodes 111 for private blockchain system 109, devices or systems that are authorized to access information stored in private blockchain system 109, or the like). For example, UE 101-1 may identify contacts in an address book, call history, and/or other type of contact list associated with UE 101-1. Additionally, or alternatively, UE 101-1 and/or some other device or system may utilize artificial intelligence/machine learning ("AI/ML") techniques or other suitable techniques to identify UEs 101 with which UE 101-1 has communicated.

UE 101-1 may output (at 305) an invitation to join (e.g., as a node 111 and/or as an authorized viewer of information stored in private blockchain system 109) to identified UEs 101-2, 101-3, and 101-4. In some embodiments, UE 101-1 (e.g., an application or application programming interface ("API") associated with UE 101-1) may communicate with contacts in a contact list associated with UE 101-1 (e.g., where the contacts include UEs 101-2, 101-3, and 101-4 in this example) via one or more suitable messaging or other types of communication applications, and may identify particular ones of the contacts participate in a key escrow or other type of key exchange. UE 101-1 may output an invitation to private blockchain system 109 to the identified contacts via the messaging or other communication applications and/or some other suitable communication pathway. In some embodiments, the invitation may include identifying information associated with UE 101-1, such as an IP address associated with UE 101-1, a Mobile Directory Number ("MDN") associated with UE 101-1, an International Mobile Station Equipment Identity ("IMEI") associated with UE 101-1, an International Mobile Subscriber Identity ("IMSI") associated with UE 101-1, and/or some other suitable identifier.

UEs 101-2, 101-3, and 101-4 may accordingly join (at 307, 309, and 311, respectively) private blockchain system 109. For example, such UEs 101-2, 101-3, and 101-4 may register as nodes 111 using information provided (at 305) by UE 101-1, and/or may access information stored in private blockchain system 109 using such information. In this manner, private blockchain system 109 may be "private" inasmuch as UEs 101 which were not invited (at 305) to private blockchain system 109 may not access the information stored in private blockchain system 109.

Figure 4:
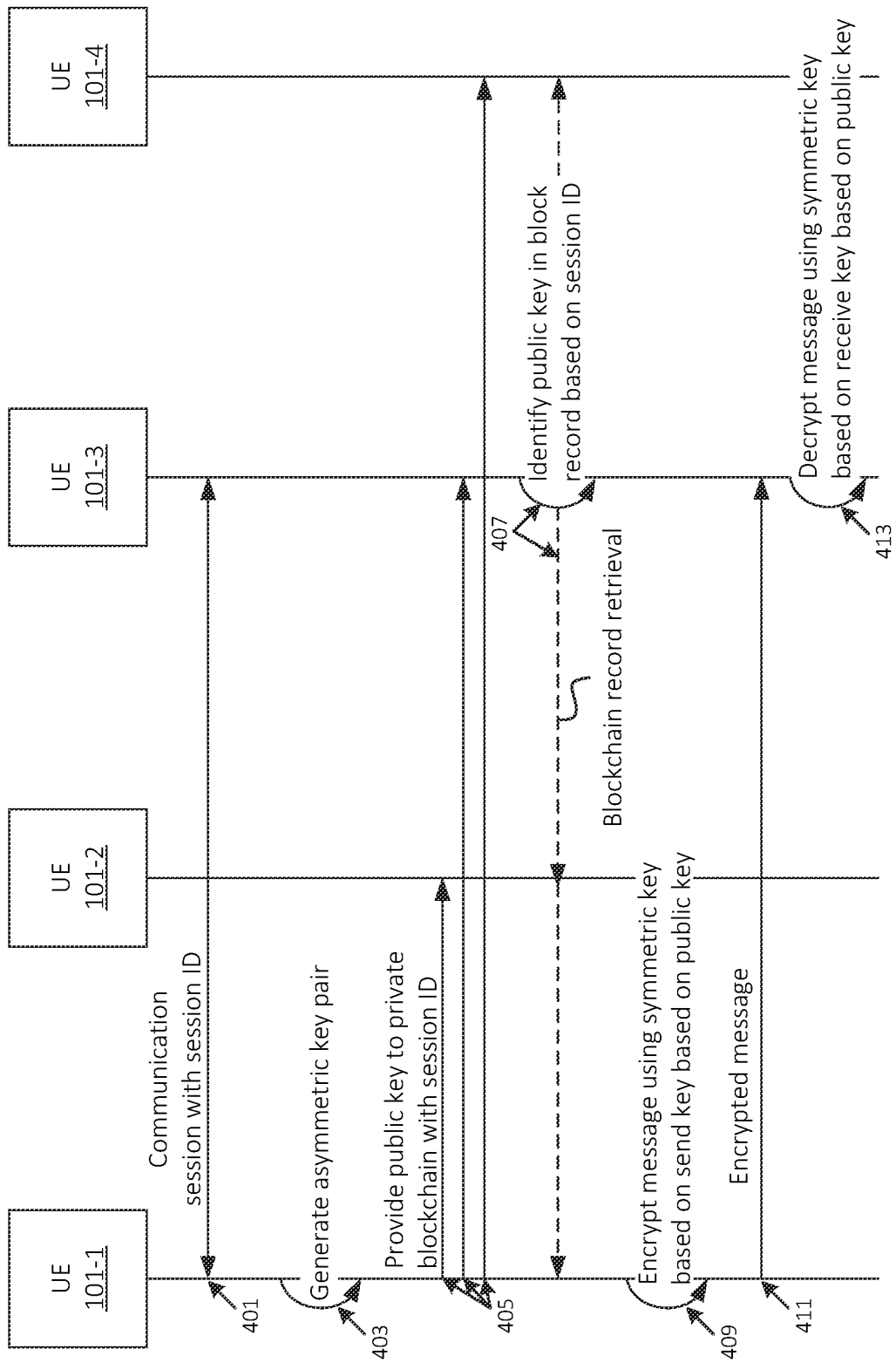
FIG. 4 illustrates an example of using a shared public key via a private blockchain system, in accordance with some embodiments, in a communication that utilizes double ratchet techniques to secure communications.

FIG. 4 illustrates an example of the use of private blockchain system 109 to exchange public keys in the encryption and/or decryption of secure communications between UEs 101 participating in a secure communication session. In this example, UEs 101-1, 101-2, 101-3, and 101-4 may be nodes 111 of private blockchain system 109. Further, UEs 101-1 and 101-3 may be participants in a communication session (e.g., via respective messaging clients 201 associated with UEs 101-1 and 101-3). For example, UE 101-1 and UE 101-3 may establish (at 401) a secure communication session using any suitable session establishment technique or protocol. The communication session may be associated with a session identifier or other suitable mechanism by which UEs 101-1 and/or 101-3 may identify the communication session. For example, an initiator of the communication session may generate or otherwise determine an identifier for the communication session, and/or UEs 101-1 and 101-3 may otherwise negotiate or determine an identifier for the communication session.

UE 101-1 may further generate (at 403) an asymmetric key pair, which may be used as part of a double ratchet technique, a Signal Protocol technique, and/or some other encryption technique used to secure communications between UEs 101-1 and 101-3. For example, the asymmetric key pair generated (at 403) by UE 101-1 may include a public key used in the generation of a send key used to encrypt communications sent to UE 101-3. While not explicitly shown in FIG. 4, UE 101-3 may also generate one or more keys that may be used in the encryption and/or decryption of messages between UEs 101-1 and 101-3, in accordance with the double ratchet technique, Signal Protocol technique, and/or other suitable encryption technique.

UE 101-1 may further provide (at 405) the public key of the generated asymmetric key pair to private blockchain system 109. As noted above, UEs 101-1, 101-2, 101-3, and 101-4 may be nodes 111 of private blockchain system 109. In other examples, UE 101-3 (e.g., a participant in the secure communication session) may not be a node 111 of private blockchain system 109, and thus UE 101-1 may not directly provide (at 405) the public key to UE 101-3. When providing (at 405) the public key to private blockchain system 109, UE 101-1 may include the session identifier of the communication session between UEs 101-1 and 101-3, and/or some other suitable identifier based on which UE 101-3 may identify (at 407) the public key provided by UE 101-1.

For example, as discussed above, UE 101-3 may retrieve (at 407) the public key from private blockchain system 109 based on identifying a record in private blockchain system 109 that includes the session identifier or other suitable identifier associated with UEs 101-1 and/or 101-3. In situations where multiple blocks exist with the session identifier, UE 101-3 may identify a latest (e.g., newest) block. For example, in accordance with the double ratchet and/or Signal Protocol techniques, a new public key may be provided each time a message is sent and/or received by UE 101-1 and/or UE 101-3. As such, identifying a latest public key associated with the communication session between UEs 101-1 and 101-3 may facilitate the secure communications according to the double ratchet and/or Signal Protocol techniques.

UE 101-1 may further encrypt (at 409) a message for UE 101-3 using a symmetric key (e.g., a send key, as similarly discussed above) that UE 101-1 generates based on the public key, one or more private keys, and/or one or more KDFs (e.g., Send KDF 205). UE 101-1 may proceed to output (at 411) the encrypted message to UE 101-3. UE 101-3 may decrypt (at 413) the message using a symmetric key (e.g., the same symmetric key as UE 101-1 used to encrypt (at 409) the message), which may be generated by one or more KDFs (e.g., Receive KDF 207) based on the retrieved (at 407) public key.

While FIG. 4 shows an example of one message being sent from UE 101-1 to UE 101-3, similar techniques may be employed when UE 101-1 sends additional messages to UE 101-3, and/or when UE 101-3 sends messages to UE 101-1. For example, UE 101-3 may generate a subsequent asymmetric key pair that is derived from and/or is otherwise based on the retrieved (at 407) public key, and may output a public key of the subsequent asymmetric key pair to private blockchain system 109. UE 101-3 may utilize this subsequently generated public key to generate a send key, and UE 101-1 may utilize this subsequently generated public key, retrieved from private blockchain system 109, to generate a receive key, as described above.

Figure 5:
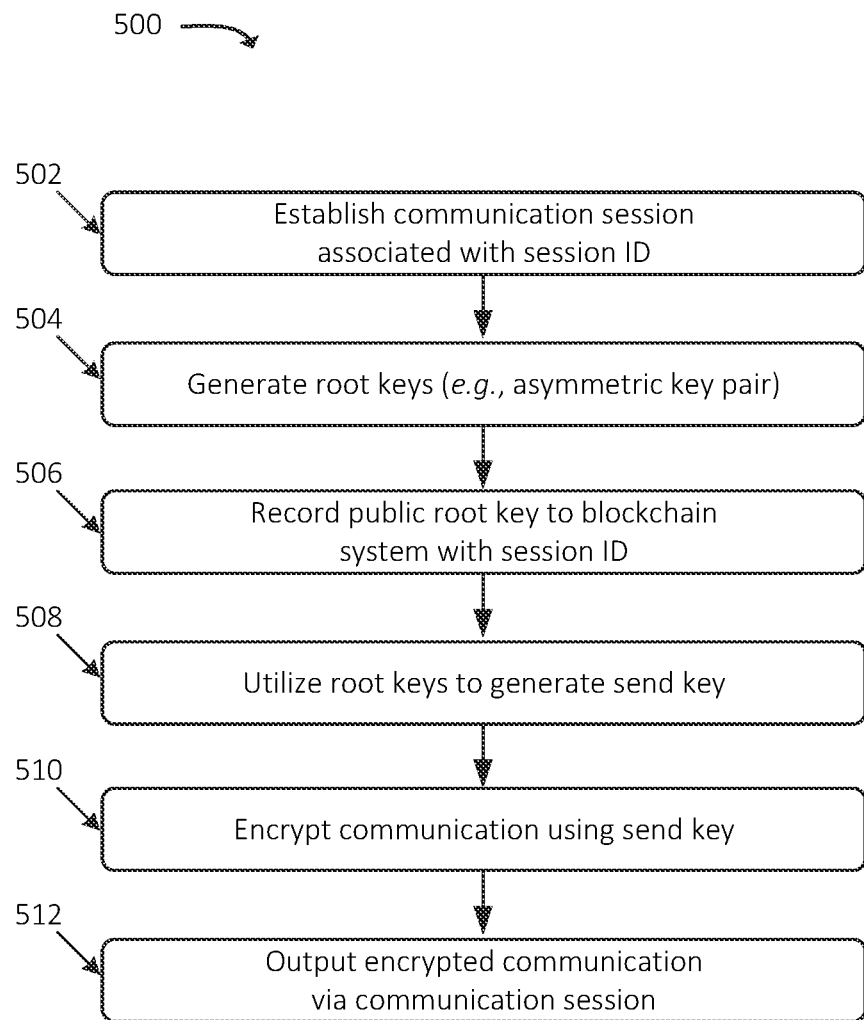
FIGS. 5 and 6 illustrate example processes for using a shared public key via a private blockchain system, in accordance with some embodiments, in a communication that utilizes double ratchet techniques to secure communications.
Figure 6:
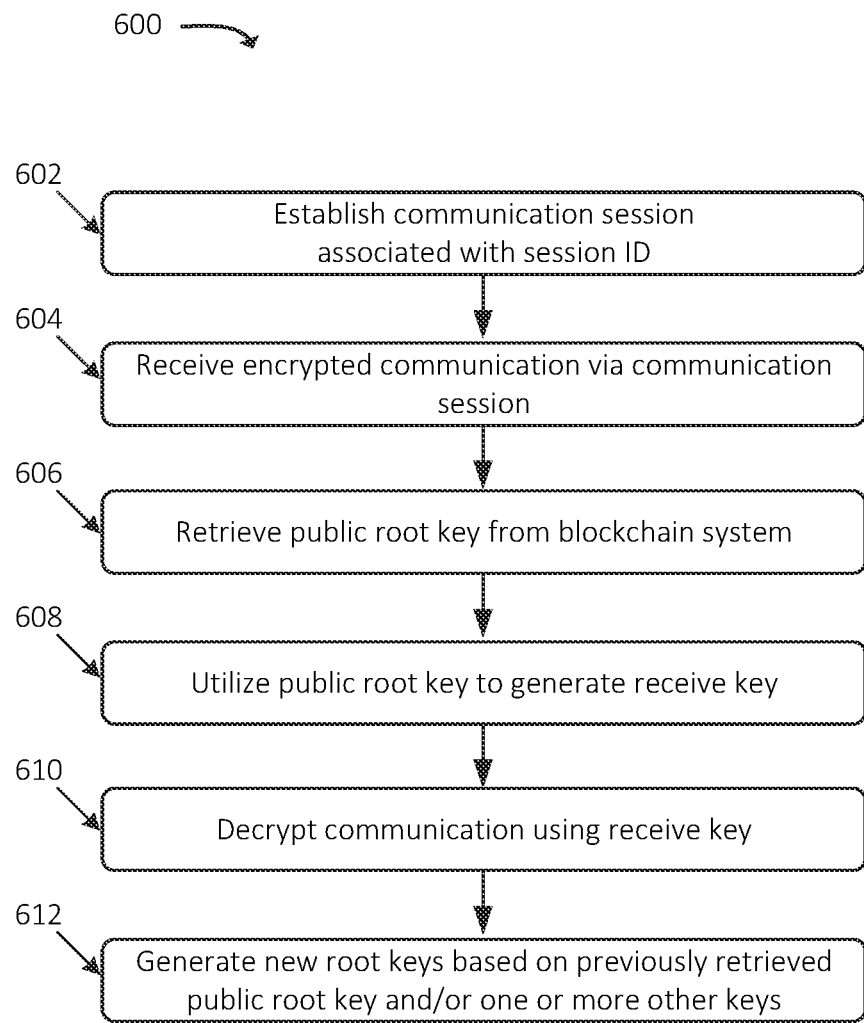

FIGS. 5 and 6 illustrate example processes 500 and 600, respectively, for utilizing blockchain techniques to share and/or exchange public keys. In the examples provided herein, the key exchange may be part of a Diffie-Hellman key exchange, a key exchange portion of a Signal Protocol technique, a key exchange portion of a double ratchet technique, and/or some other suitable secure exchange of public keys. In some embodiments, some or all of process 500 and/or 600 may be performed by one or more UEs 101 (e.g., UEs 101 engaged in a communication session with each other and/or one or more other UEs 101). In some embodiments, one or more other devices may perform some or all of processes 500 and/or 600 in concert with, and/or in lieu of, UE 101.

As shown, process 500 may include establishing (at 502) a communication session with one or more UEs 101. The communication session may be associated with a session identifier or other identifier based on which participant UEs 101 of the communication session may identify messages exchanged with one another and/or public keys, associated with the communication session, recorded to private blockchain system 109 in accordance with embodiments described herein.

Process 500 may further include generating (at 504) a set of root keys, which may include an asymmetric key pair. For example, as discussed above, the root keys may include a private key which may be maintained securely by UE 101, and a public key which may ultimately be shared with one or more other UEs 101 (e.g., another participant in the communication session).

Process 500 may additionally include recording (at 506) the public root key (e.g., the public key of the asymmetric key pair generated at 504) to private blockchain system 109. For example, UE 101 may output the public key to private blockchain system 109, and private blockchain system 109 may propagate the information to one or more nodes 111 of private blockchain system 109. Nodes 111 may form a consensus regarding the addition of the provided public key to one or more records of private blockchain system 109, and may maintain an immutable record of the provided public key. In some embodiments, the record may include a timestamp, a block identifier, and/or other mechanism by which a recency or age of the record may be determined. As similarly described above, the record may further include a communication session identifier, an identifier of UE 101 from which the information was received, and/or other suitable information.

Process 500 may also include utilizing (at 508) the root keys to generate a send key. For example, as discussed above, Root KDF 203 may utilize the root keys (e.g., including the root public key, as well as the root private key and/or one or more other keys) to generate a root key output, and may provide the root key output to another KDF, such as Send KDF 205. Send KDF 205 may generate a send key based on the root key output from Root KDF 203 and/or based on one or more other keys or functions. As discussed above, the generated send key may be a symmetric key that may be identical to a receive key generated by a recipient of the public key, based on a Signal Protocol technique, a double ratchet technique, etc.

Process 500 may further include encrypting (at 510) a communication using the send key. Process 500 may additionally include outputting (at 512) the encrypted communication via the communication session, such as to a UE 101 with which the communication session was established (at 502).

As shown in FIG. 6, process 600 may include establishing (at 602) a communication session. For example, as similarly discussed above, UE 101 may establish a communication session with one or more other UEs 101. The communication session may be associated with a suitable identifier, based on which the UEs 101 participating in the communication session may identify communications associated with the communication session, including encrypted messages, public keys, and/or other information.

Process 600 may further include receiving (at 604) an encrypted communication via the communication session. For example, the communication may have been encrypted using one or more KDFs, where the input to the one or more KDFs include the public root key and one or more other keys (e.g., one or more private keys, one or more KDF outputs, etc.).

Process 600 may further include retrieving (at 606) a public root key from private blockchain system 109. In some embodiments, private blockchain system 109 and/or one or more devices or systems communicatively coupled to private blockchain system 109 may "push" the public root key to private blockchain system 109. For example, the one or more devices or systems may identify a particular block that includes an identifier of UE 101 (e.g., where the particular block includes the identifier of UE 101 and a public root key), may identify a particular block that includes an identifier of the communication session (e.g., where the particular block includes the identifier of the communication session and a public root key), etc. Additionally, or alternatively, UE 101 may "pull" the information from private blockchain system 109 based on a suitable identifier (e.g., an identifier of UE 101, an identifier of the communication session, etc.).

Process 600 may additionally include utilizing (at 608) the public root key to generate a receive key. For example, as discussed above, UE 101 may utilize one or more KDFs, such as Root KDF 203 and/or Receive KDF 207, to generate a receive key. The receive key may be a symmetric key with respect to a key used to encrypt a communication received by UE 101 via the communication session. For example, as discussed above, the receive key may be identical to a send key used by a sender of the communication, where the send key was also generated based on one or more KDFs and at least the public root key. For example, the sender and UE 101 may perform double ratchet techniques, Signal Protocol techniques, or the like, to respectively encrypt and decrypt the communication, without transmitting or sharing the symmetric key itself.

Process 600 may further include decrypting (at 610) the communication, received via the communication session, using the generated receive key. For example, UE 101 may apply one or more functions to decrypt the receive message using the receive key, which, as discussed above, may be the same as a send key used to encrypt the communication.

Process 600 may additionally include generating (at 612) a new set of root keys based on the previously retrieved public root key and one or more other root keys. For example, once UE 101 generates the receive key, the public root key (retrieved at 606) may be discarded and/or not used for sending messages from UE 101. In some situations, UE 101 may maintain the public root key and apply techniques described above to decrypt subsequent communications from the sender in situations where the sender sends multiple communications in a row without any intervening messages from UE 101. The new set of root keys may be generated based on the receive key (generated at 608), the public root key (retrieved at 606), and/or one or more other suitable keys. UE 101 may then proceed to output the newly generated public root key to private blockchain system 109, as similarly described above with respect to operation 506 of process 500, may generate (e.g., similar to operation 508) a new send key based on the newly generated public root key, etc.

Embodiments described above are presented in the context of communication sessions between two UEs 101. Embodiments described herein may further provide for secure blockchain-based key exchange mechanisms for group communication sessions that include more than two participants (e.g., between three or more UEs 101). For example, techniques described below provide for a blockchain-based key exchange such that group messages may be encrypted such that only participants in the group are able to access (e.g., decrypt) the messages. Further, as discussed below, situations may arise in which a participant in a communication session receives an encrypted message from another participant, but does not possess one or more keys needed to decrypt the message (e.g., a public key associated with the sender), and/or has not received confirmation from the blockchain that the participant is in possession of such keys. Techniques described below provide for the recipient to securely obtain the one or more keys from blockchain system 109 in order to decrypt the message. Further, embodiments described below provide for the use of one or more devices or systems, such as a Key Escrow System ("KES"), to serve as a fallback in instances where one or more keys cannot be obtained from blockchain system 109, such as when a particular group message communication session participant does not participate in blockchain-based key exchange techniques described herein.

Figure 7:
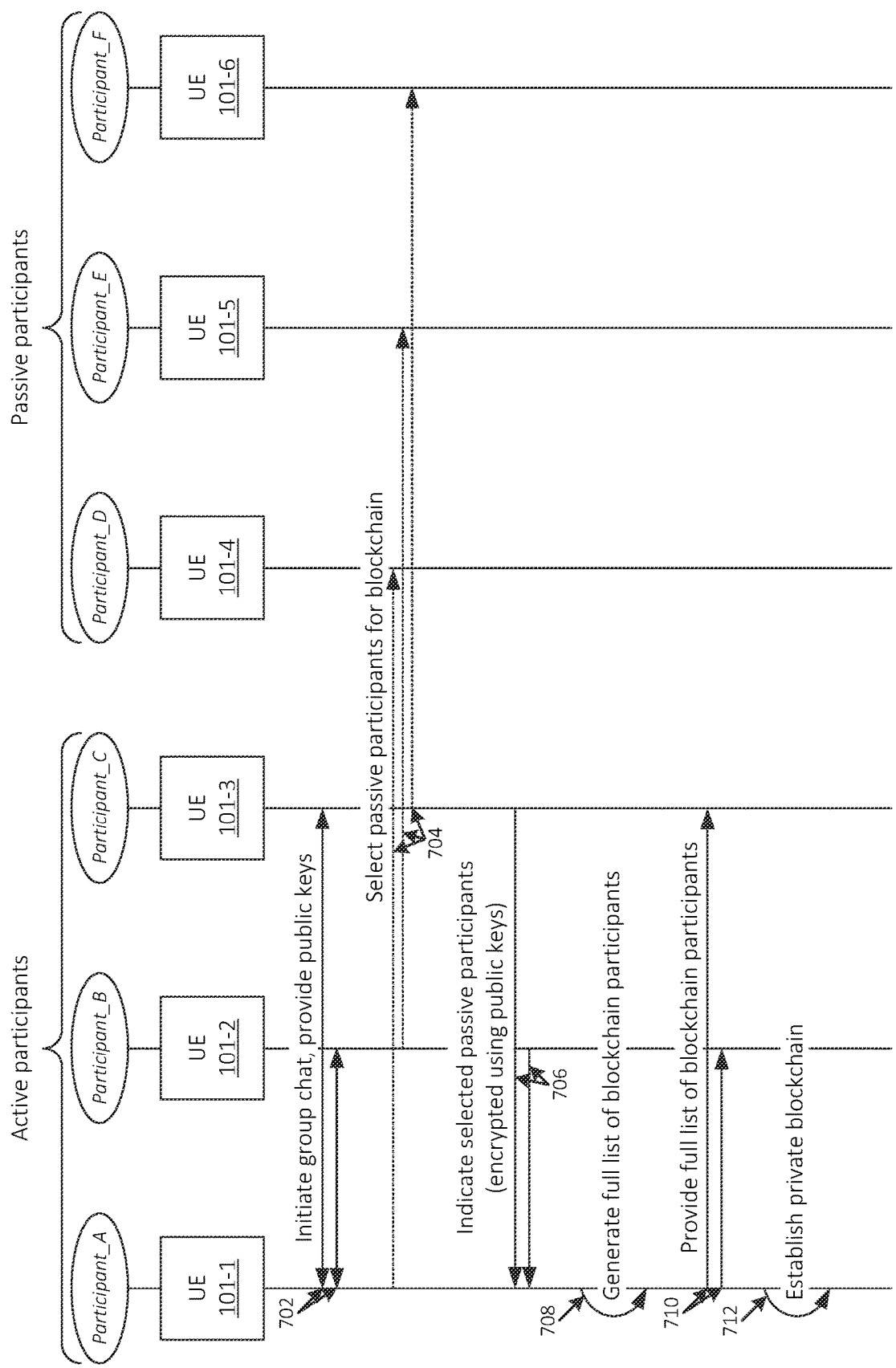
FIG. 7 illustrates an example initiation of a group communication session, in accordance with some embodiments.

FIG. 7 illustrates an example establishment of a group communication session that uses blockchain-based secure key exchange techniques. In this example, assume that the group communication session is between UEs 101-1, 101-2, and 101-3 (also referred to as "Participant_A," "Participant_B," and "Participant_C"). As shown, UE 101-1 may initiate (at 702) a group communication session (also referred to as a "group chat"), such as by sending (at 702) one or more messages to UEs 101-2 and 101-3. For example, a messaging application (e.g., a particular messaging client 201) of UE 101-1 may communicate with the same or a different messaging application (e.g., respective messaging clients 201) of UEs 101-2 and 101-3. The message(s) sent (at 702) by UE 101-1 may include one or more Rich Communication Suite ("RCS") messages or messages of another type or protocol. In some embodiments, the message(s) may include a session identifier associated with the group communication session, may include identifiers associated with UEs 101-1, 101-2, and/or 101-3 (e.g., IP addresses, SIP addresses, MDNs, etc.), and/or one or more other suitable identifiers. In some embodiments, the message(s) may include one or more instructions, indications, requests, etc. to implement blockchain-based key exchange for the communication session. In this example, assume that UEs 101-1, 101-2, and 101-3 support and/or have accepted the instruction, request, etc. to utilize blockchain-based key exchange.

UEs 101-1, 101-2, and 101-3 may further select (at 704) passive participants, or nodes 111, for blockchain system 109 to securely maintain keys associated with the group communication session. For example, as similarly discussed above, UEs 101-1, 101-2, and 101-3 may automatically select contacts from respective address books, contacts lists, etc. In this example, UE 101-1 may select UE 101-4 as a node 111 for blockchain system 109, UE 101-2 may select UE 101-5 as a node 111 for blockchain system 109, and UE 101-3 may select UE 101-6 as a node 111 for blockchain system 109.

UEs 101-2 and 101-3 may indicate (at 706) their respective selections of nodes 111 to UE 101-1. For example, UE 101-2 may provide an identifier (e.g., MDN, IP address, etc.) of UE 101-5, and UE 101-3 may provide an identifier of UE 101-6. In some embodiments, UE 101-1 may have also provided (at 702) a public key to UEs 101-2 and 101-3. In some embodiments, UEs 101-2 and/or 101-3 may have provided (at 702) respective public keys to UE 101-1 as part of the group comm session initiation. In some embodiments, UEs 101-2 and 101-3 may each encrypt (e.g., using suitable public keys, such as a public key of UE 101-1) the messages sent (at 706) to UE 101-1, including the identifiers of UEs 101-5 and 101-6.

UE 101-1 may generate (at 708) a full list of blockchain participants, including active participant UEs 101-1, 101-2, and 101-3, as well as passive participant UEs 101-4, 101-5, and 101-6. UE 101-1 may provide (at 710) the full list of blockchain participants to UEs 101-2 and 101-3, thus providing for UEs 101-2 and 101-3 to be aware of, and therefore able to communicate with, blockchain system 109 once established. In some embodiments, UE 101-1 may encrypt the messages (sent at 710) with a private key, which may be associated with the public key provided at 702. For example, the public and private keys may be associated with the same asymmetric key pair. UEs 101-2 and 101-3 may be able to use the public key (received at 702) of UE 101-1 to decrypt the provided list of blockchain participants. Additionally, or alternatively, UE 101-1 may encrypt the messages (sent at 710) with public keys of respective recipients. For example, UE 101-1 may encrypt the message (sent at 710) for UE 101-2 using a public key (e.g., as provided at 702) of UE 101-2, and may encrypted the message for UE 101-3 using a public key of UE 101-3.

UE 101-1 may proceed to establish (at 712) blockchain system 109, which may include generating a genesis block, providing the genesis block to nodes 111 of blockchain system 109 (e.g., UEs 101-2 through 101-6), and/or other operations to establish blockchain system 109. In some embodiments, the genesis block or other data included in or associated with blockchain system 109 may include or may be based on the session identifier associated with the group communication session. In this manner, different blockchain systems 109 may be associated with different communication sessions and may have different session identifiers.

Figure 8:
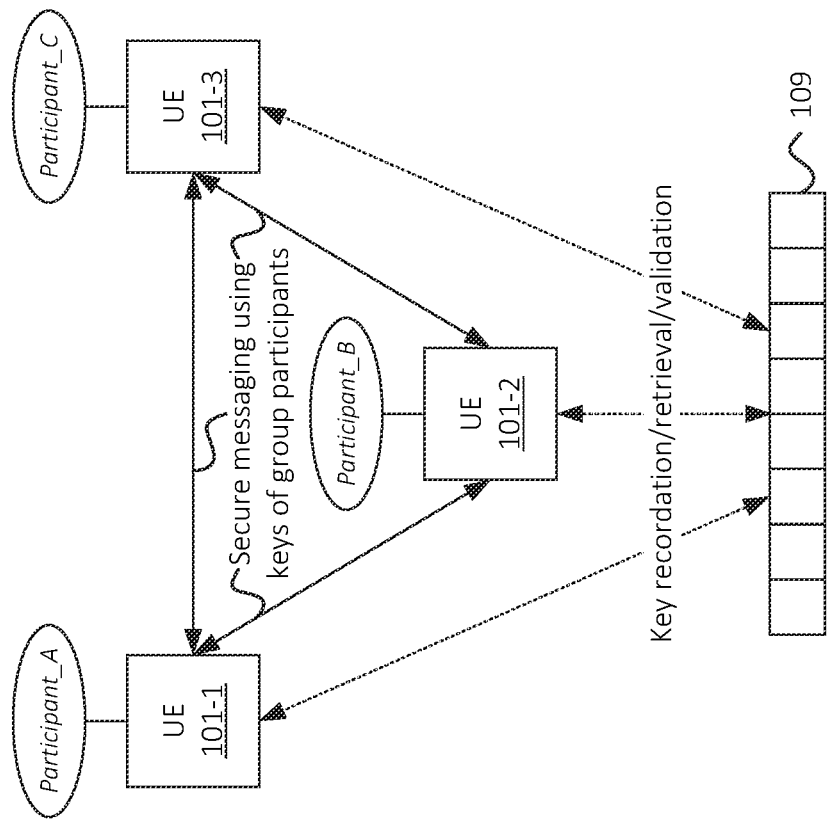
FIG. 8 illustrates an example of secure group messaging using a private blockchain system, in accordance with some embodiments.

As shown in FIG. 8, in situations where active participants of a group communication session (e.g., UEs 101-1, 101-2, and 101-3) support and/or otherwise participate in blockchain-based key exchange techniques, such active participants may record suitable keys (e.g., public keys that may be used to derive symmetric keys used to encrypt and/or decrypt messages, as discussed above) to private blockchain system 109, and may retrieve and/or validate suitable keys (e.g., keys associated with other active participants) from private blockchain system 109. For example, when obtaining keys from blockchain system 109, a particular UE 101 obtaining such keys may perform one or more cross-validation techniques in order to verify that the keys are accurate and/or have not been compromised in some way (e.g., a "man-in-the-middle" attack or some other type of malicious action).

Situations may arise in which a participant of a group communication session does not support blockchain-based key exchange techniques, and/or otherwise does not implement or participate in the blockchain-based key exchange techniques described above. For example, a particular UE 101 may not have an API or application installed, via which UE 101 would serve as a node 111 or other type of participant in private blockchain system 109. Additionally, or alternatively, a user of such UE 101 may not provide consent to utilize blockchain-based key exchange techniques, and/or may indicate a preference or instruction not to utilize blockchain-based key exchange techniques for one or more group communication sessions.

Figure 9:
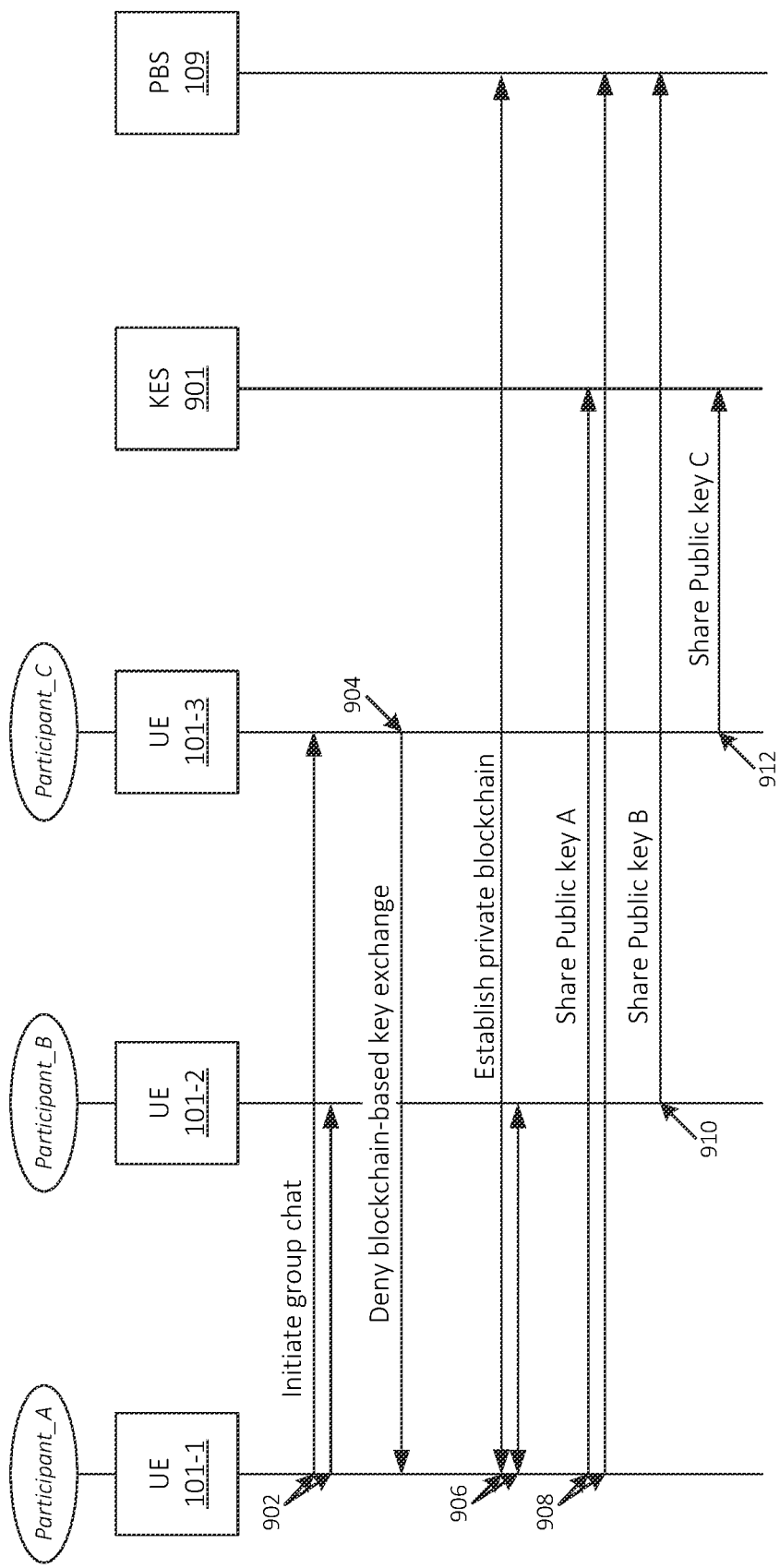
FIG. 9 illustrates an example initiation of a group communication session with one or more participants that do not support blockchain-based key exchange techniques, in accordance with some embodiments.

For example, as shown in FIG. 9, UE 101-1 may initiate (at 902) a group communication session with UEs 101-2 and 101-3, which may indicate outputting one or more RCS messages or other types of messages indicating the initiation of the group communication session. As similarly discussed above, UE 101-1 may indicate that the group communication session is associated with blockchain-based key exchange techniques. In this example, assume that UE 101-2 accepts the indication that the group communication session is associated with blockchain-based key exchange techniques, and/or does not deny the indication. For example, UE 101-2 may implement one or more APIs or applications via which UE 101-2 may serve as a node 111 of, and/or otherwise communicate with, private blockchain system 109. As another example, a user of UE 101-2 may provide consent via a pop-up notification or other type of message or notification presented by UE 101-2 when receiving the group chat initiation from UE 101-1. Accordingly, UE 101-2 may output a notification to UE 101-1 that UE 101-2 implements, and/or has received consent to implement, a blockchain-based key exchange for the initiated group communication session. Additionally, or alternatively, UE 101-2 may forgo outputting any such notification to UE 101-1, based on which UE 101-1 may determine (e.g., based on the absence of such notification) that UE 101-2 will implement a blockchain-based key exchange for the initiated group communication session.

On the other hand, UE 101-3 may output (at 904) an indication that UE 101-3 has denied the blockchain-based key exchange for the initiated group communication session. Such indication from UE 101-3 may indicate, for example, that UE 101-3 does not support blockchain-based key exchange, that a user of UE 101-3 has not consented to blockchain-based key exchange for the initiated group communication session, and/or that UE 101-3 will otherwise not implement blockchain-based key exchange for the group communication session. As one example, the group chat initiation message (at 902) may include a RCS message or other type of message, that includes a flag, indicator, etc. associated with blockchain-based key exchange. UE 101-3 (e.g., a messaging application of UE 101-3 or other suitable type of application or API) may determine that the flag, indicator, etc. is not recognized and/or otherwise refers to one or more techniques (e.g., blockchain-based key exchange techniques) that are not implemented or supported by UE 101-3. As another example, a user of UE 101-3 may have indicated a preference not to use blockchain-based key exchange for the group communication session, and/or has not indicated consent to use blockchain-based key exchange for the group communication session.

As discussed herein, private blockchain system 109 may still be used for the group communication session, in addition to one or more other devices or systems (e.g., KES 901), in order to provide for secure key exchange for the group communication session. The incorporation of KES 901 into the secure key exchange adds robustness as well as allows for a seamless experience between UEs 101 with different capabilities, preferences, and/or levels of user consent to use blockchain-based key exchange techniques.

UE 101-1 may further perform (at 906) one or more operations to establish private blockchain system 109, as similarly discussed above. For example, UE 101-1 may communicate with UE 101-2 (which has not denied blockchain-based key exchange techniques) and/or one or more other UEs 101 (e.g., passive participants, as discussed above) to establish a particular private blockchain system 109 associated with the group communication session. Since UE 101-3 has denied (at 904) the use of blockchain-based key exchange for the group communication session, the establishment (at 906) of private blockchain system 109 may, in some embodiments, not include communicating with UE 101-3 to establish private blockchain system 109.

UEs 101-1, 101-2, and 101-3 may further share respective public keys to facilitate the group communication session. For example, as discussed above, UEs 101-1, 101-2, and 101-3 may share public keys so that such public keys may be used by other respective UEs 101-1, 101-2, and 101-3 of the group communication session to encrypt and/or decrypt messages (e.g., using symmetric keys, as discussed above, and/or in some other suitable manner). In some embodiments, such keys may be shared with an identifier (e.g., MDN, IP address, etc.) of a particular UE 101 with which the keys are associated, a session identifier associated with the group communication session, a key identifier that is unique to each key, and/or other suitable value.

In accordance with some embodiments, UE 101-1 may share (at 908) a public key associated with UE 101-1 (sometimes referred to in the figures as "Public key A" for the sake of clarity) to private blockchain system 109. For example, since one or more UEs 101 of the group communication session (e.g., UEs 101-1 and 101-2) participate in blockchain-based key exchange techniques, UE 101-1 may determine that the public key associated with UE 101-1 should be shared to private blockchain system 109. Additionally, since one or more UEs 101 of the group communication session (e.g., UE 101-3, in this example) do not participate in blockchain-based key exchange techniques, UE 101-1 may further determine that the public key associated with UE 101-1 should be shared to KES 901. For example, based on receiving (at 904) the indication from UE 101-3 that UE 101-3 has denied, does not support, etc. blockchain-based key exchange techniques for the group communication session, UE 101-1 may share its public key to KES 901 in addition to private blockchain system 109.

KES 901 may, for example, be a pre-designated device or system associated with a messaging application or API (e.g., messaging client 201) via which UEs 101-1, 101-2, and 101-3 carry out the group communication session. Additionally, or alternatively, KES 901 may have been selected by UE 101-1, elected by nodes 111 of private blockchain system 109, selected by UE 101-3, and/or selected in some other suitable manner. In some embodiments, as part of the group chat initiation (at 902), and/or based on receiving (at 904) a denial of UE 101-3 to participate in blockchain-based key exchange techniques, UE 101-1 may provide an IP address, URL, and/or other identifier of KES 901 to other participants of the group communication session (e.g., UEs 101-2 and/or 101-3).

In some embodiments, sharing (e.g., at 908) a public key via KES 901 may include providing authentication and/or session information, such that public key may be obtained only by authorized entities. For example, when sharing the public key of UE 101-1 to KES 901, UE 101-1 may provide a session identifier of the group communication session, and/or respective identifiers of UEs 101 associated with the group communication session (e.g., MDNs, IP addresses, etc. of UEs 101-1, 101-2, and/or 101-3) with the public key. In this manner, when providing such keys, KES 901 may perform one or more authentication or authorization techniques in order to verify that an entity requesting public keys associated with the group communication session is authorized to receive such keys.

In some embodiments, UE 101-2 may share (at 910) a public key associated with UE 101-2 (e.g., Public key B) to private blockchain system 109. For example, UE 101-2 may not be "aware" that UE 101-3 does not support and/or has denied the use of blockchain-based key exchange techniques. Further, since UE 101-3 does not support and/or has denied the use of blockchain-based key exchange techniques, UE 101-3 may share (at 912) a public key associated with UE 101-3 (e.g., Public key C) to KES 901.

Thus, at this stage, private blockchain system 109 may maintain public keys associated with UEs 101-1 and 101-2, and KES 901 may maintain public keys associated with UEs 101-1 and 101-3. As discussed above, private blockchain system 109 and KES 901 may also maintain, with each key, a UE identifier, a group communication session identifier, a key identifier, and/or other suitable information based on which keys can be suitably identified and/or retrieved.

Figure 10:
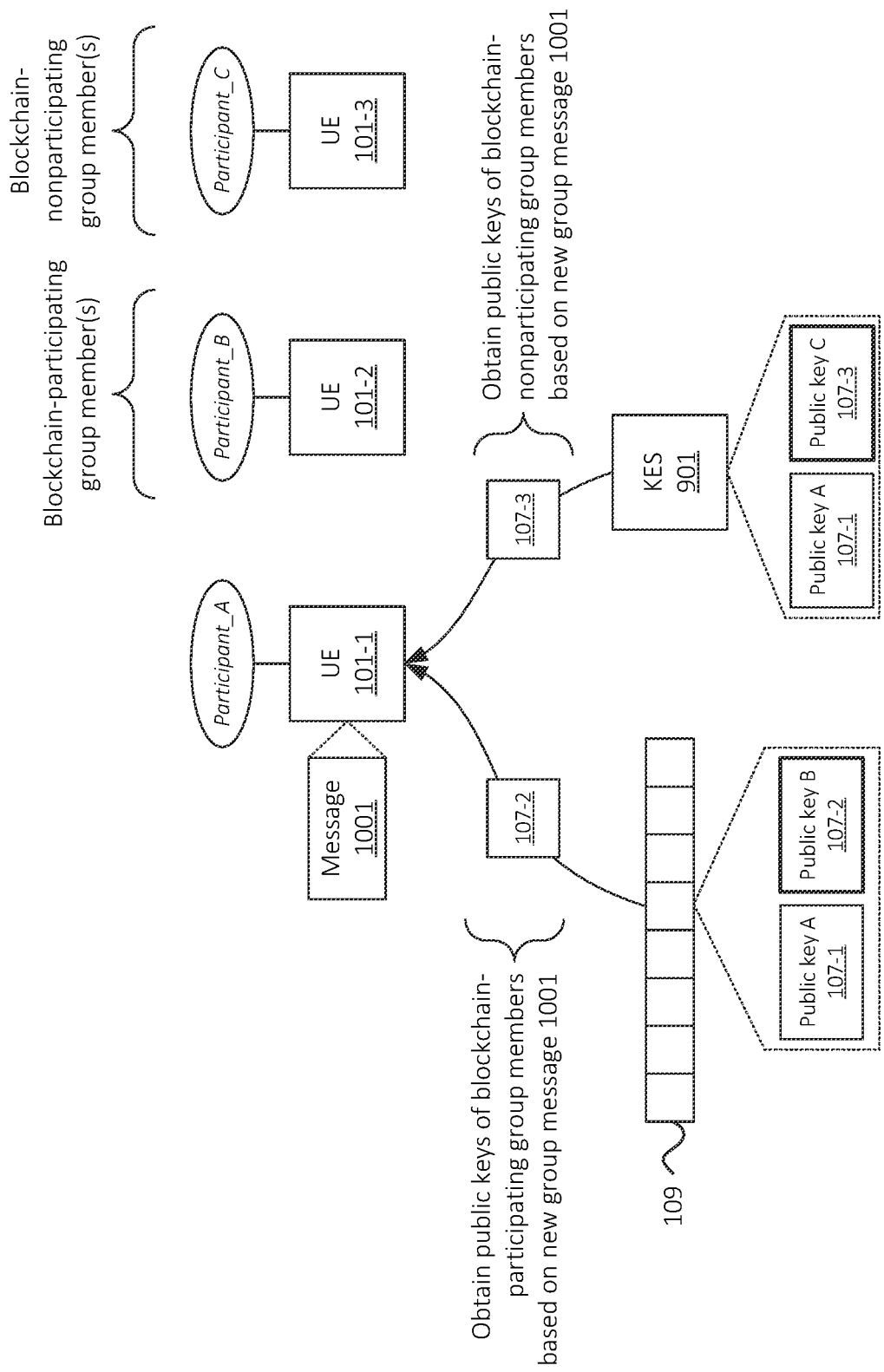
FIG. 10 illustrates an example of obtaining public keys associated with active participants of a group communication session from a private blockchain system as well as from a Key Escrow System ("KES"), in accordance with some embodiments.

As shown in FIG. 10, UE 101-1 may have an outgoing group message 1001 to send to participants of the group communication session (i.e., UEs 101-2 and 101-3, in this example). For example, a user of UE 101-1 may have provided input such as text, audio, an image, etc. to be sent to UEs 101-2 and 101-3 associated with the group communication session. Such input may be provided, for example, via a suitable messaging application executing at UE 101-1 (e.g., messaging client 201). Based on receiving the input specifying outgoing message 1001, UE 101-1 may determine that UE 101-1 does not have possession of public keys associated with the other active participants of the group communication session, namely public keys 107-2 and 107-3 associated with UEs 101-2 and 101-3 (e.g., Public key B and Public key C). Additionally, or alternatively, UE 101-1 may determine that UE 101-1 is in possession of public key 107-2 (e.g., may have received one or more public keys 107 by virtue of being a node 111 of blockchain system 109), but may determine that such public key 107-2 has not been confirmed, validated, etc. by blockchain system 109.

Accordingly, as shown, UE 101-1 may obtain public key 107-2 from blockchain system 109. As discussed above, for example, public key 107-2 may have previously been recorded to blockchain system 109 by UE 101-2. In some embodiments, UE 101-1 may identify public key 107-2 by identifying a session identifier recorded with public key 107-2 and/or a UE identifier of UE 101-2 recorded with public key 107-2, as discussed above. In some embodiments, UE 101-1 may identify public key 107-2 based on a key identifier associated with public key 107-2. For example, based on detecting that UE 101-1 does not have possession of public key 107-2, and/or based on detecting that UE 101-1 has received input specifying outgoing message 1001, UE 101-1 may output requests to UEs 101-2 and 101-3 for key identifiers associated with public keys 107-2 and 107-3 of UEs 101-2 and 101-3. In such embodiments, UEs 101-2 and 101-3 may provide such key identifiers, based on which UE 101-1 may search blockchain system 109 and/or otherwise identify corresponding public keys 107-2 and 107-3.

Since UE 101-1 has determined (e.g., at 904) that UE 101-3 is not participating in blockchain-based key exchange techniques for the group communication session (and/or based on determining that UE 101-2 is participating in such blockchain-based key exchange techniques), UE 101-1 may obtain public key 107-2, associated with UE 101-2, from private blockchain system 109 (e.g., by using one or more the identifiers discussed above). Further, UE 101-1 may obtain public key 107-3, associated with UE 101-3, from KES 901 (e.g., by using one or more the identifiers discussed above).

That is, since UE 101-1 is "aware" that UE 101-3 is not participating in blockchain-based key exchange techniques, UE 101-1 may forgo attempting to retrieve public key 107-2 from private blockchain system 109, as public key 107-2 is not expected to be located within private blockchain system 109. In other words, UEs 101-1 may obtain public keys of blockchain-participating group communication session members (e.g., UE 101-2, in this example) from private blockchain system 109, and may obtain public keys of blockchain-nonparticipating group communication session members (e.g., UE 101-3, in this example) from KES 901.

In some embodiments, when obtaining keys (e.g., public keys 107-2 and 107-3, in this example) from blockchain system 109, a particular UE 101 obtaining such keys (e.g., UE 101-1, in this example) may perform one or more cross-validation techniques in order to verify that the keys are accurate and/or have not been compromised in some way (e.g., a "man-in-the-middle" attack or some other type of malicious action). For example, in this example, UE 101-1 may compute a hash of one or more blocks of blockchain system 109 from which public keys 107-2 and/or 107-3 were obtained, and/or may otherwise identify or generate information based on information recorded to blockchain system 109 that corresponds to public keys 107-2 and 107-3.

UE 101-1 may further communicate with one or more other nodes 111 of blockchain system 109 in order to verify the information (e.g., the hash of the one or more blocks from which public keys 107-2 and/or 107-3 were obtained). When quorum is reached (e.g., UE 101-1 has received at least a threshold quantity of confirmations from other nodes 111) with respect to the hash or other suitable information, UE 101-1 may identify that the obtained public keys 107-2 and 107-3 are valid, accurate, etc., thus enhancing the security of the group communication session. Similar concepts may apply in situations where UE 101-1 already has possession of public keys 107-2 and 107-3 (e.g., in situations where UE 101-1 is a node 111 of blockchain system 109 and has therefore received public keys 107-2 and 107-3 when UEs 101-2 and 101-3 provided such public keys 107 to blockchain system 109). For example, UE 101-1 may identify a local copy of blockchain system 109, may obtain public keys 107-2 and 107-3 from the local copy of blockchain system 109, and may perform a cross-validation process (e.g., may communicate with other nodes 111 of blockchain system 109) to verify that public keys 107-2 and 107-3 from the local copy of blockchain system 109 is accurate, valid, etc.

In other figures that discuss the obtaining of information (e.g., respective public keys 107) from blockchain system 109, a given UE 101 obtaining such information may perform similar operations in order to verify the authenticity, accuracy, etc. of the obtained information. Similarly, in other examples that discuss whether a given UE 101 is in possession of particular information (e.g., respective public keys 107), such examples may also refer to whether the given UE 101 has received confirmations from other nodes 111 (e.g., at least a threshold quantity of nodes 111, such that a quorum is reached) that such information is valid, even in instances where the given UE 101 already has possession of the information. That is, the given UE 101 may store a copy of one or more public keys 107 (e.g., within a local copy of blockchain system 109), but may not be considered in "possession" of such public keys 107, in accordance with some embodiments, if UE 101 has not received confirmation, validation, etc. from at least a threshold quantity of nodes 111 of blockchain system 109 that such copies of public keys 107 are valid, accurate, etc.

Figure 11:
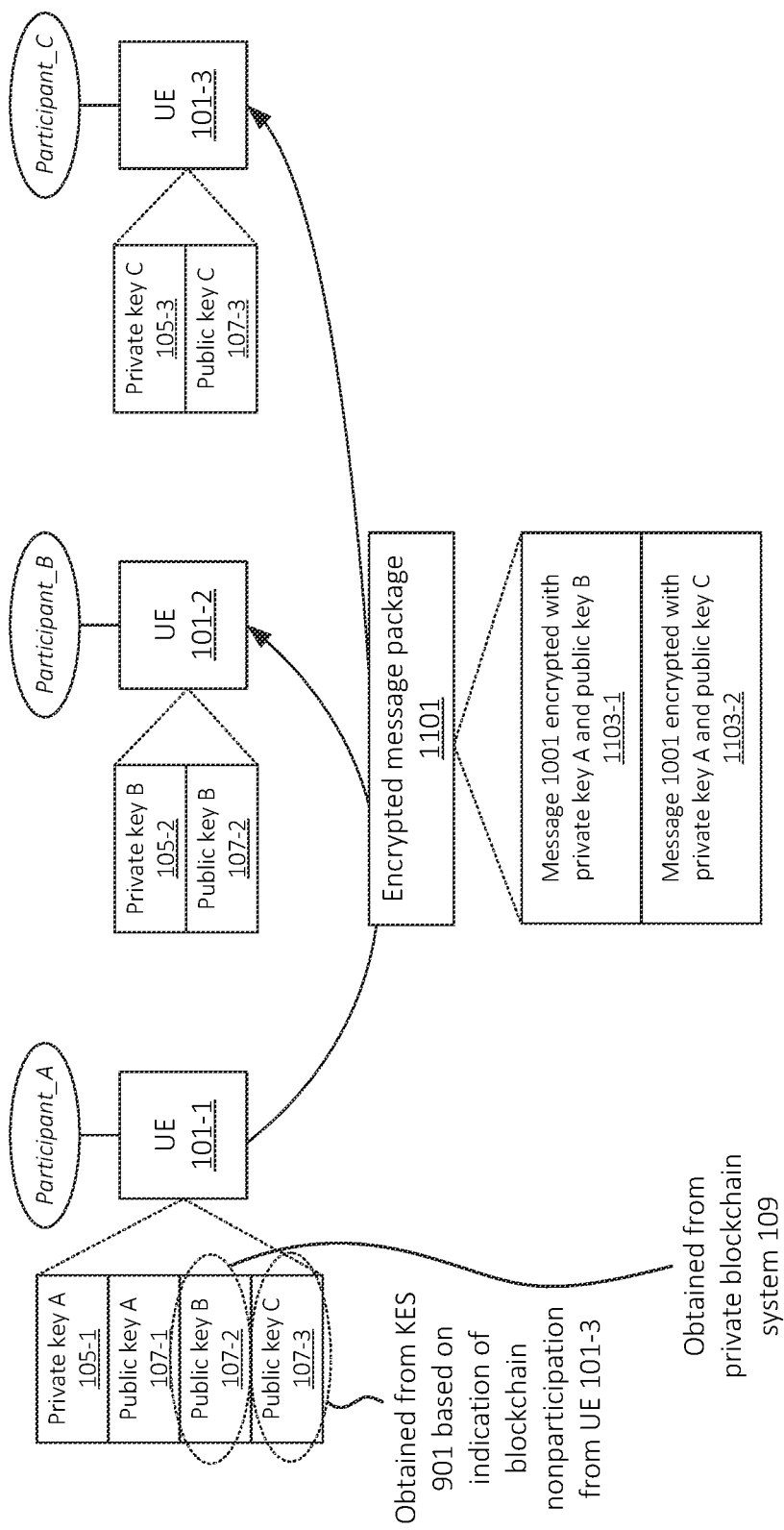
FIG. 11 illustrates an example of outputting an encrypted message package to multiple participants of a group communication session, in accordance with some embodiments.

As shown in FIG. 11, after retrieving public keys 107-2 and 107-3 from blockchain system 109 and/or KES 901, UE 101-1 may have possession of public keys 107-2 and 107-3, as well as its own private key 105-1 (also referred to in the figures as "Private key A") and public key 107-1. As further shown, at this point, UEs 101-2 and 101-3 may have possession of their own respective private keys 105 and public keys 107, but may not yet have possession of private keys 105 or public keys 107 associated with other UEs 101.

UE 101-1 may generate encrypted message package 1101 based on message 1001, and send encrypted message package 1101 to UEs 101-2 and 101-3. As shown, encrypted message package 1101 may include first portion 1103-1 and second portion 1103-2. In some embodiments, encrypted message package 1101 may include other information, such as an identifier of UE 101-1, a key identifier associated with public key 107-1, and/or other suitable information.

Portion 1103-1 may include a first encrypted version of message 1001, while portion 1103-2 may include a second encrypted version of message 1001. The first encrypted version of message 1001 (e.g., as included in portion 1103-1) may, in some embodiments, be encrypted based on private key 105-1 (e.g., Private key A) and public key 107-2 (e.g., Public key B). For example, the first encrypted version of message 1001 may be encrypted based on a symmetric key derived from private key 105-1 and public key 107-2. Similarly, the second encrypted version of message 1001 (e.g., as included in portion 1103-2) may be encrypted based on private key 105-1 and public key 107-3 (e.g., a symmetric key derived from Private key A and Public key C).

In some embodiments, portion 1103-1 may include an identifier of UE 101-2 and/or a key identifier associated with public key 107-2, such that UE 101-2 is able to identify that UE 101-2 is the recipient of portion 1103-1 and/or that public key 107-2 has been used in the encryption of message 901 included in portion 1103-1. Similarly, portion 1103-2 may include an identifier of UE 101-3, a key identifier, and/or some other suitable information, such that UE 101-3 is able to identify that UE 101-3 is the recipient of portion 1103-2.

Figure 12:
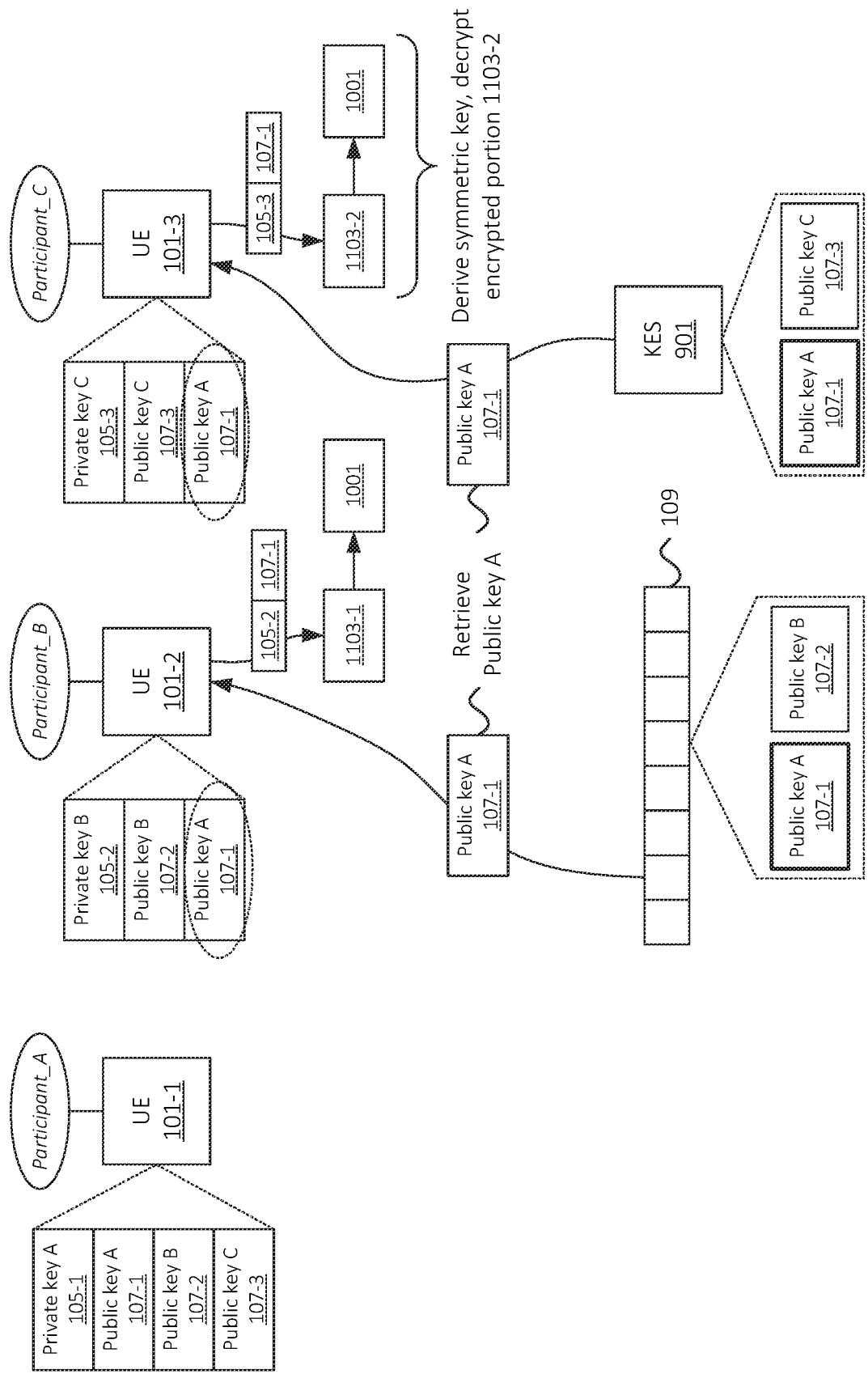
FIG. 12 illustrates an example of recipients of an encrypted message package obtaining a public key of a sender of the encrypted message from a blockchain system and/or from a KES, in accordance with some embodiments.

As shown in FIG. 12, UE 101-2 may retrieve public key 107-1 (e.g., Public key A) from blockchain system 109, based on receiving encrypted message package 1101. For example, UE 101-2 may identify that portion 1103-1 includes an encrypted message from UE 101-1 associated with the group communication session. For example, as discussed above, encrypted message package 1101 and/or respective portions 1103 may include a session identifier associated with the group communication session, key identifier, and/or identifiers of UEs 101-2 and/or 101-3. As discussed above, retrieving public key 107-1 from blockchain system 109 may further include cross-validating the retrieved public key 107-1 with at least a threshold quantity of nodes 111 of blockchain system 109.

As further shown in FIG. 12, since UE 101-3 does not implement blockchain-based key exchange techniques, UE 101-3 may retrieve public key 107-1 from KES 901. For example, UE 101-3 may identify that portion 1103-2 of encrypted message package 1101 includes an encrypted message from UE 101-1 associated with the group communication session. UE 101-3 may request public key 107-1 from KES 901. For example, UE 101-3 may output a query, request, etc. that includes an identifier of UE 101-1, an identifier of the group communication session, and/or other suitable information based on which public key 107-1 may be identified. In this example, since KES 901 has possession of public key 107-1, and further assuming that KES 901 performs one or more suitable authentication and/or authorization operations to verify that UE 101-3 is authorized to obtain public key 107-1, KES 901 may provide public key 107-1 to UE 101-3.

Once UEs 101-2 and 101-3 have obtained public key 107-1, UE 101-2 may be in possession of public key 107-1 as well as its own private key 105-2 and public key 107-2, and UE 101-3 may also be in possession of public key 107-1 as well as its own private key 105-3 and public key 107-3. UEs 101-2 and 101-3 may accordingly decrypt their own respective portions 1103-1 and 1103-2 in order to extract original message 1001. For example, as similarly discussed above, UE 101-2 may derive a symmetric key based on private key 105-2 (e.g., Private key B) and public key 107-1 (e.g., Public key A), and may use the symmetric key to decrypt portion 1103-1 in order to extract message 1001. Similarly, UE 101-3 may derive a symmetric key based on private key 105-3 (e.g., Private key C) and public key 107-1 (e.g., Public key A), and may use the symmetric key to decrypt portion 1103-2 in order to extract message 1001.

Figure 13:
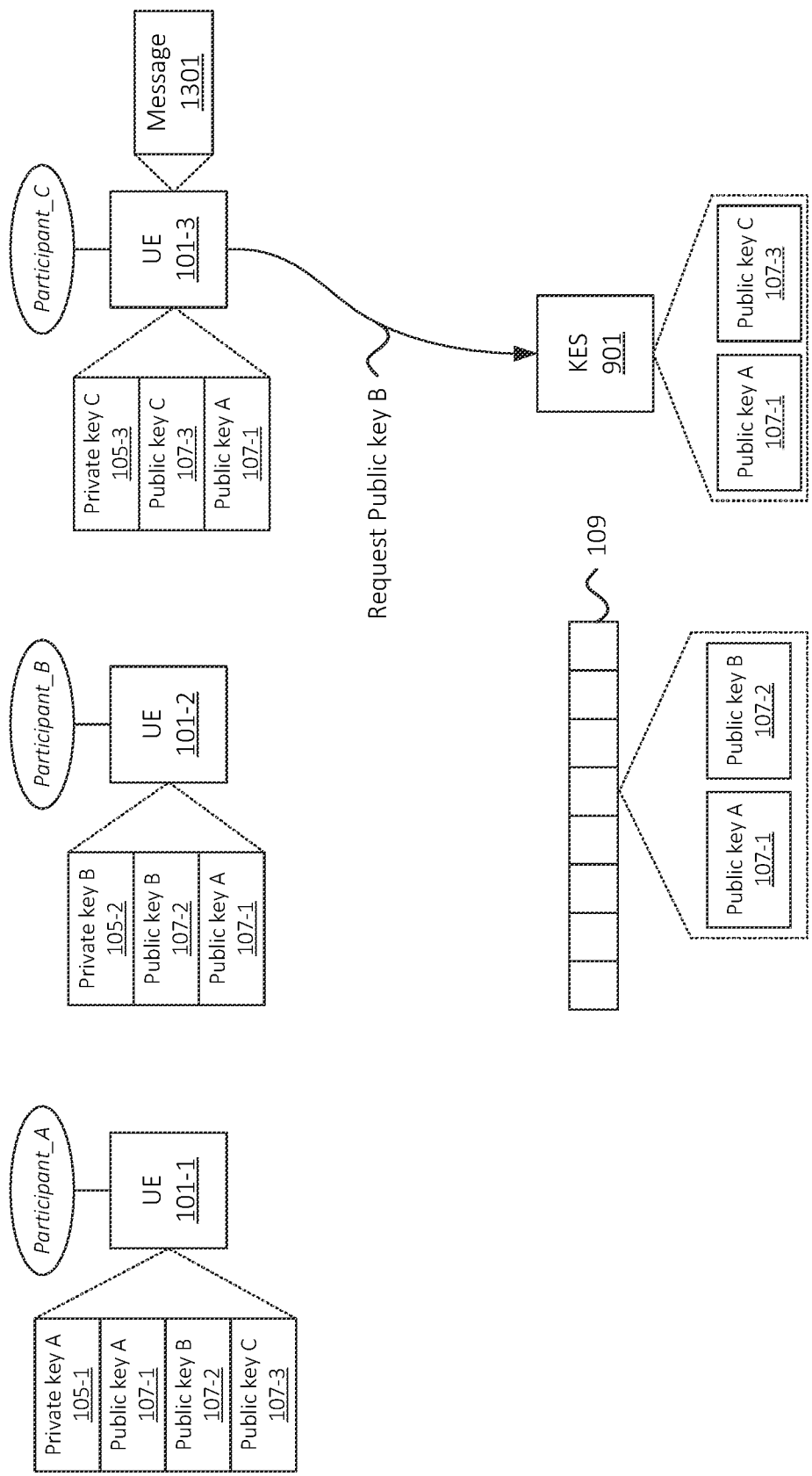
FIGS. 13 and 14 illustrate an example of a sender of a message, which does not support blockchain-based key exchange techniques, obtaining a public key of one or more participants of a group communication session that is associated with blockchain-based key exchange techniques, in accordance with some embodiments.

As shown in FIG. 13, UE 101-3 may receive input specifying outgoing message 1301, associated with the same group communication session. Based on operations described above, UE 101-1 may be in possession of keys 105-1, 107-1, 107-2, and 107-3; UE 101-2 may be in possession of keys 105-2, 107-1, and 107-2; and UE 101-2 may be in possession of keys 105-3, 107-1, and 107-3.

Based on receiving the input specifying message 1301, UE 101-3 may identify that UE 101-3 is not in possession of a public key associated with UE 101-2. Accordingly, UE 101-3 may request public key 107-2, associated with UE 101-2, from KES 901. That is, even though public key 107-2 has been recorded to private blockchain system 109, UE 101-3 may not have access to private blockchain system 109, may not implement one or more APIs or other interfaces associated with private blockchain system 109, a user of UE 101-3 may have opted out of using private blockchain system 109, etc. As such, UE 101-3 may instead request public key 107-2 from KES 901.

In some embodiments, based on receiving the request for public key 107-2, KES 901 may output a request to UE 101-2 for public key 107-2. For example, KES 901 may, in some situations, not possess public key 107-2, and/or may possess an old or "stale" copy of public key 107-2. For example, KES 901 may maintain public key 107-2, but UE 101-2 may, in some embodiments, generate new public keys 107 on an ongoing basis, such as upon the generating or sending of new messages, based on the expiration of a timer, etc.

Additionally, or alternatively, in some embodiments, even in situations where UE 101-3 does not record or submit information to private blockchain system 109, UE 101-3 may have access to read, obtain, etc. information recorded to private blockchain system 109. For example, during an establishment procedure of private blockchain system 109, UE 101-1 may indicate, to nodes 111 of private blockchain system 109, that UE 101-3 is authorized to retrieve information recorded to private blockchain system 109. Additionally, or alternatively, private blockchain system 109 may be associated with one or more explorers, crawlers, etc. that maintain world state information associated with private blockchain system 109 (e.g., some or all information stored in private blockchain system 109, such as up-to-date values of variables recorded to private blockchain system 109). UE 101-3 may communicate with such explorers, crawlers, etc. in order to obtain public key 107-2, in this example. In some embodiments, as discussed below, KES 901 may have access to read, obtain, etc. information recorded to private blockchain system 109. In such embodiments, KES 901 may access private blockchain system 109 to obtain public key 107-2, and may provide public key 107-2 to UE 101-3.

Figure 14:
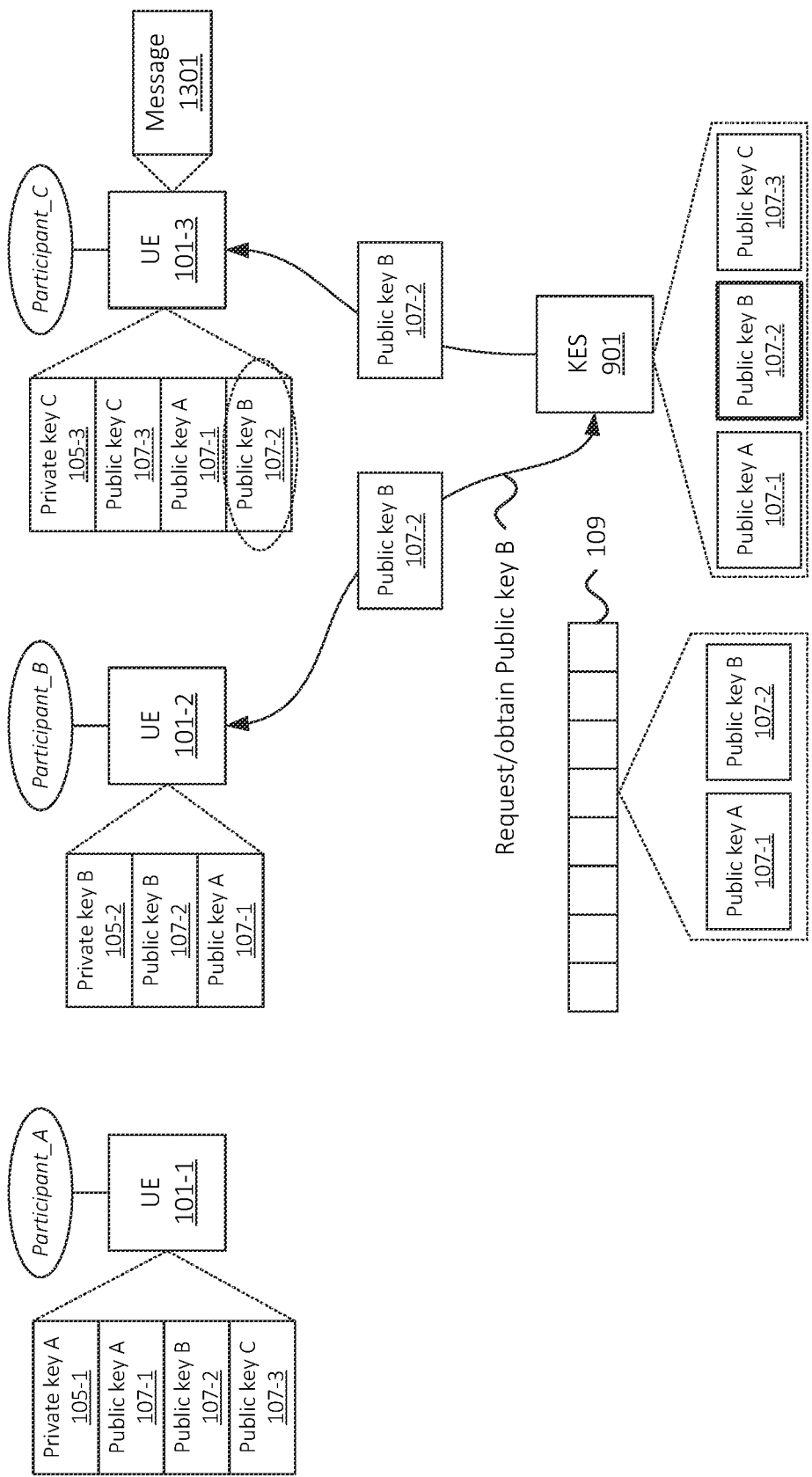

In some embodiments, as shown in FIG. 14, KES 901 may request public key 107-2 from UE 101-2, based on receiving the request from UE 101-3 for public key 107-2. For example, in some embodiments, KES 901 may be isolated from private blockchain system 109 (e.g., may not have access to private blockchain system 109, and/or may not be "aware" of private blockchain system 109), and thus is incapable of retrieving public key 107-2 from private blockchain system 109. UE 101-2 may accordingly provide the requested public key 107-2 to KES 901, which may forward public key 107-2 to UE 101-3. In this manner, UEs 101-2 and 101-3 need not communicate directly in order for UE 101-2 to provide public key 107-2 to UE 101-3, thus reducing the possibility of public key 107-2 becoming exposed and the group communication session becoming compromised. Further, in this manner, private blockchain system 109 may be isolated from KES 901, thus removing the reliance on trusting KES 901, which may further enhance the security and integrity of the group communication session (e.g., at least from the standpoint of UEs 101-1 and 101-2, which participate in private blockchain system 109).

Figure 15:
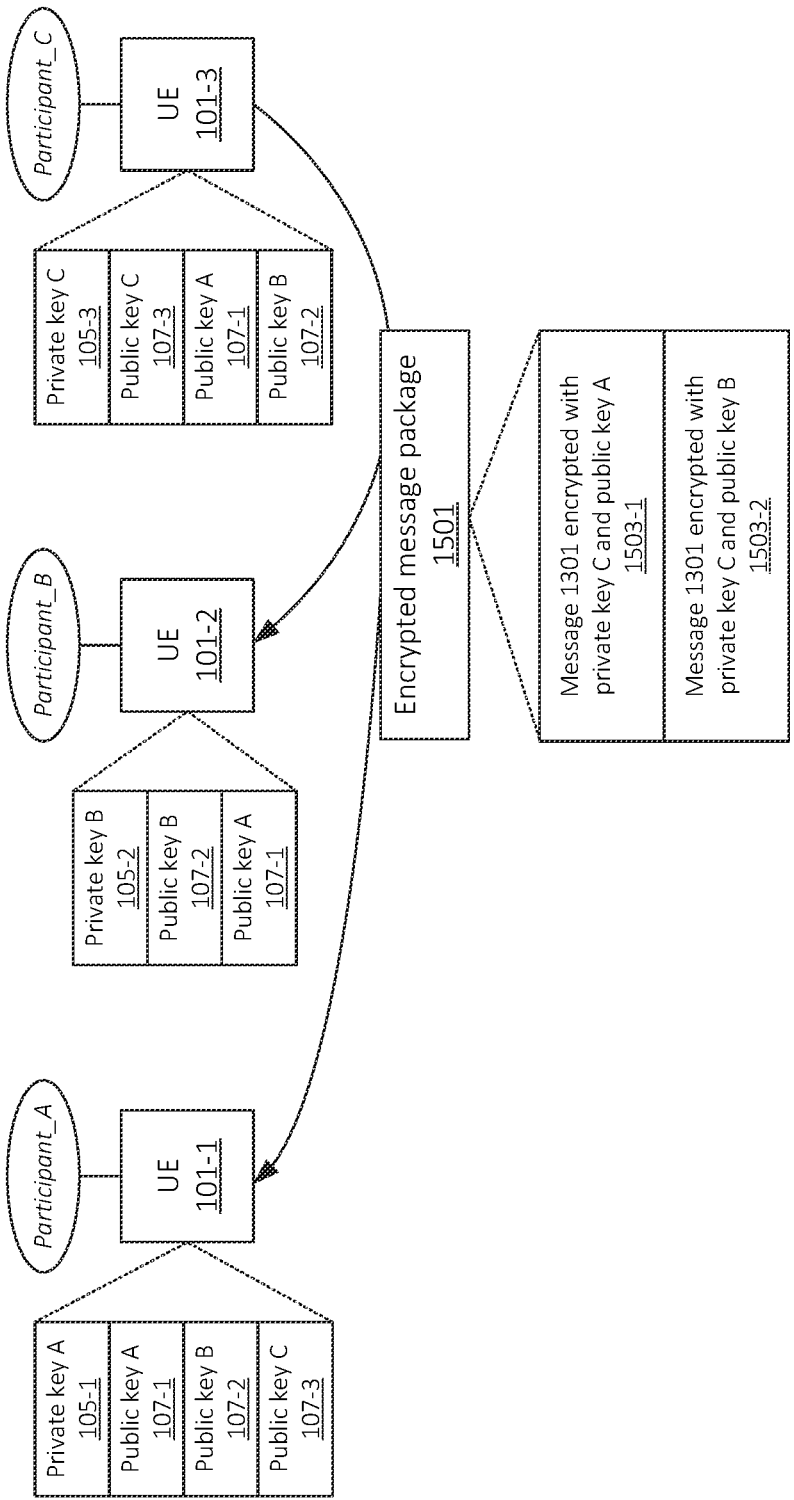
FIG. 15 illustrates an example of outputting an encrypted message package to multiple participants of a group communication session, in accordance with some embodiments.

Based on receiving (e.g., as discussed above with respect to FIG. 14) public key 107-2, and further based on the previous receiving (e.g., as discussed above with respect to FIG. 12) of public key 107-1, UE 101-3 may encrypt and send message 1301 to UEs 101-1 and 101-2. For example, as shown in FIG. 15, and as similarly discussed above, UE 101-3 may generate encrypted message package 1501, which may include encrypted portions 1503-1 and 1503-2. Encrypted portion 1503-1 may include, for example, a first encrypted version of message 1301, and encrypted portion 1503-2 may include a second encrypted version of message 1301. For example, the first encrypted version of message 1301 may be encrypted based on a symmetric key associated with UEs 101-1 and 101-3 (e.g., Public key A and Private key C), and the second encrypted version of message 1301 may be encrypted based on a symmetric key associated with UEs 101-2 and 101-3 (e.g., Public key B and Private key C).

Figure 16:
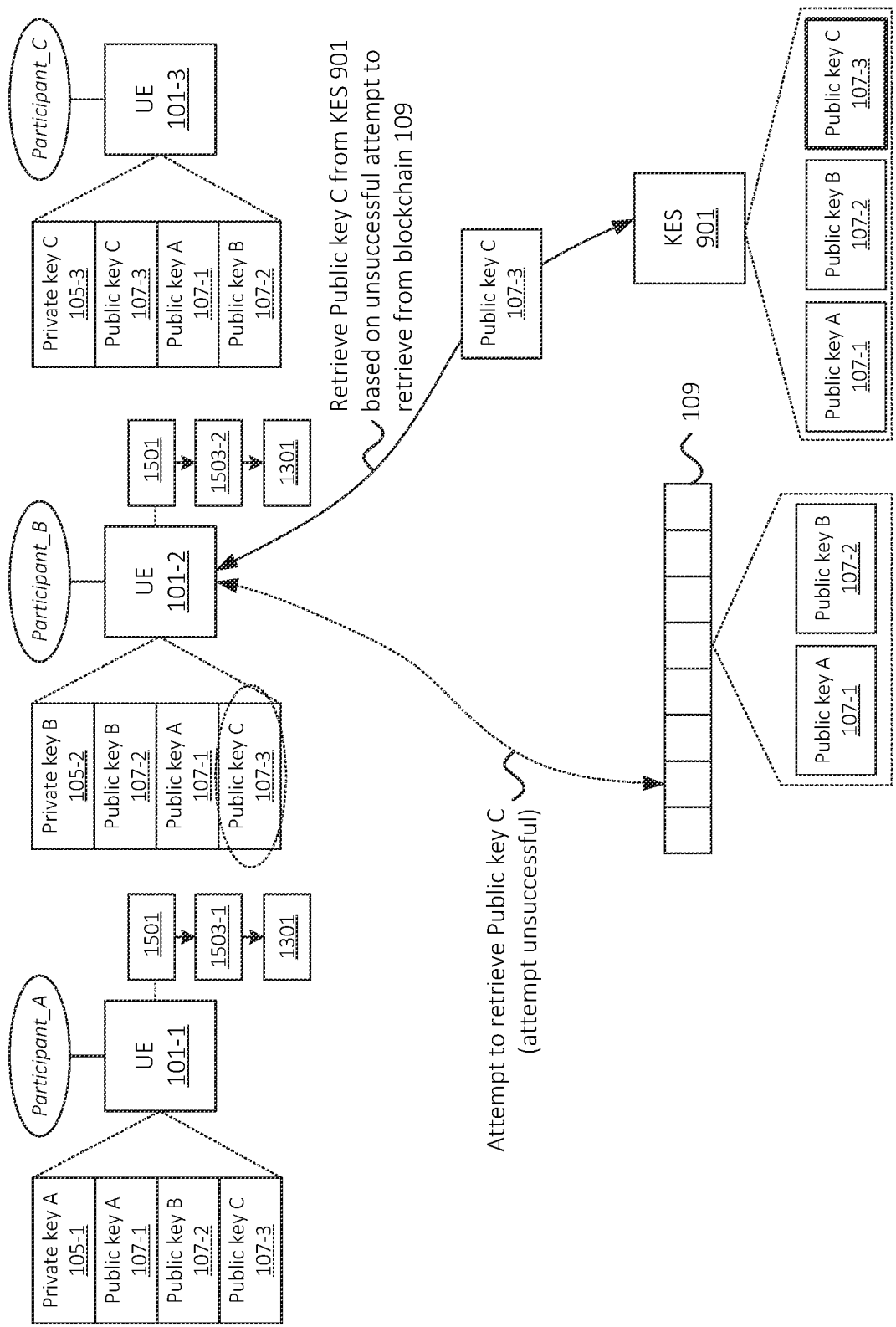
FIG. 16 illustrates an example of obtaining a public key, associated with a sender of an encrypted message via a group communication session that is associated with blockchain-based key exchange techniques, from a KES, in accordance with some embodiments.

As shown in FIG. 16, UEs 101-1 and 101-2 may receive encrypted message package 1501. Since UE 101-1 has possession of public key 107-3 (e.g., based on operations discussed above), UE 101-1 may use previously obtained public key 107-3 (e.g., in conjunction with private key 105-1) to decrypt portion 1503-1 of encrypted message package 1501, in order to extract message 1301. In this example, UE 101-2 does not yet have possession of public key 107-3, and may therefore attempt to retrieve public key 107-3 from private blockchain system 109.

In this example, the attempted retrieval of public key 107-3 from private blockchain system 109 may be unsuccessful, as UE 101-3 has not provided public key 107-3 to private blockchain system 109 based on not participating in private blockchain system 109. For example, UE 101-2 may determine that private blockchain system 109 does not include public key 107-3, does not include any public keys 107 matching an identifier of UE 101-3, does not include does not include any public keys 107 matching an identifier of UE 101-3 and an identifier of the group communication session, and/or otherwise does not include public key 107-3 needed to decrypt portion 1503-2 of encrypted message package 1501. In some embodiments, UE 101-2 may determine that the attempt to retrieve public key 107-3 was unsuccessful based on a "timeout" or expiration of a timer, indicating that UE 101-2 has searched private blockchain system 109 for at least a threshold amount of time (e.g., one second, ten seconds, one minute, etc.) without locating public key 107-3.

In other situations, the attempted retrieval of public key 107-3 from private blockchain system 109 may be unsuccessful for other reasons. For example, one or more nodes 111 of private blockchain system 109 may have failed, may be offline or unreachable, etc., and UE 101-2 may thus be unable to obtain a validated copy of public key 107-3. For example, in some situations, a given key may have been receded to private blockchain system 109. A given UE 101 may identify the key and may attempt to perform a cross-validation technique in which at least a threshold quantity (e.g., a quorum) of nodes 111 confirm the key as recorded to private blockchain system 109. The cross-validation may fail if, for example, the threshold quantity of nodes 111 do not confirm, validate, etc. the key, which may occur of the threshold quantity of nodes 111 are offline or unreachable, or if the key has been compromised in some way.

Thus, in situations where public key 107-3 is not available on private blockchain system 109 (and/or if cross-validation of public key 107-3 via private blockchain system 109 has failed), UE 101-2 may request public key 107-3 from KES 901. In this example, KES 901 has possession of public key 107-3 based on previously receiving public key 107-3 (e.g., at 912). In other examples, KES 901 may output a request to UE 101-3 for public key 107-3, such as in instances where KES 901 does not have possession of public key 107-3, instances in which KES 901 has possession of an "old" or "stale" copy of public key 107-3 (e.g., where public key 107-3 was received by KES 901 over a minute ago, over an hour ago, over a day ago, etc.), and/or in other suitable instances or embodiments. As such, KES 901 may serve as a fallback or measure of redundancy to further enhance the robustness of group messaging using blockchain-based key exchange techniques.

Figure 17:
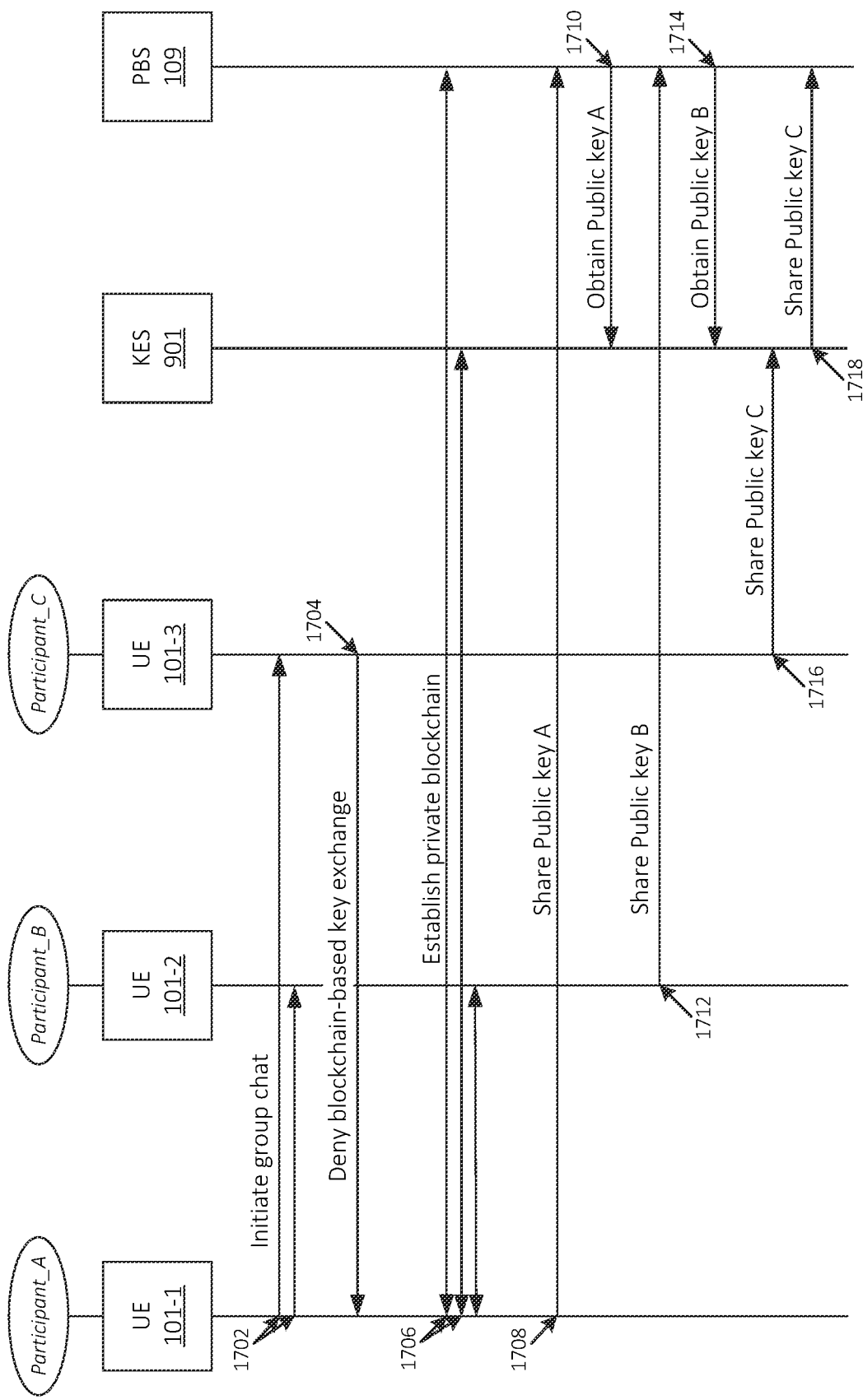
FIG. 17 illustrates an example of a KES that is a node and/or viewer of a private blockchain system associated with a group communication session, in accordance with some embodiments.

In some embodiments, as noted above, KES 901 may have access to private blockchain system 109, which may further enhance the functionality of KES 901. For example, in some embodiments, KES 901 may record information to private blockchain system 109, such as one or more keys (e.g., public key 107-3, after receiving public key 107-3 from UE 101-3). As shown in FIG. 17, UE 101-1 may initiate (at 1702) a group communication session between UEs 101-1, 101-2, and 101-3. As with the example of FIG. 9, assume that UE 101-2 supports and/or has accepted the blockchain-based key exchange techniques associated with the group communication session, and UE 101-3 may indicate (at 1704) a denial of support and/or consent to use the blockchain-based key exchange techniques.

UE 101-1 may establish (at 1706) private blockchain system 109 associated with the group communication session, which may include the selection of one or more nodes 111, the creation and/or validation of a genesis block, the association of private blockchain system 109 with a session identifier associated with the group communication session, etc. As shown, establishing (at 1706) private blockchain system 109 may include adding KES 901 as a node 111 of private blockchain system 109 and/or an authorized viewer of private blockchain system 109. In some embodiments, KES 901 may be implemented by one or more UEs 101. For example, a particular passive participant (e.g., UE 101-4, 101-5, and/or 101-6, referring to the example of FIG. 7) may be designated as KES 901. Additionally, or alternatively, KES 901 may be implemented by an application server, cloud system, datacenter, etc. In some embodiments, UE 101-1 may provide a session identifier, identifiers of group communication session participants (e.g., MDNs, IP addresses, etc. of UEs 101-1, 101-2, and 101-3), and/or other suitable information to KES 901.

Based on being added as a node 111 and/or authorized viewer of private blockchain system 109, KES 901 may be able to read and/or write to private blockchain system 109 (e.g., based on the particular permissions that were granted as part of the blockchain establishment procedure). As such, greater flexibility and robustness may be provided in the manner in which group communication session participants share and/or obtain keys.

For example, as shown, UE 101-1 may share (at 1708) public key 107-1 (e.g., Public key A) with private blockchain system 109. As discussed above, public key 107-1 may be shared along with an identifier of UE 101-1, a session identifier of the group communication session, etc. Based on being added to private blockchain system 109 (e.g., as a node 111, an authorized viewer, etc.), KES 901 may "listen" to or monitor private blockchain system 109, and may accordingly identify that public key 107-1 (shared at 1708) is associated with the group communication session. As such, KES 901 may obtain (at 1710) and/or cross-validate public key 107-1.

Similarly, UE 101-2 may share (at 1712) public key 107-2 (e.g., Public key B) to private blockchain system 109, and KES 901 may obtain (at 1714) public key 107-2. In this manner, KES 901 may retain local copies of public keys 107-1 and 107-2, which have been cross-validated with nodes 111 of private blockchain system 109. In this manner, in situations where private blockchain system 109 is unavailable or unreachable, cross-validated copies of public keys 107-1 and 107-2 may be obtainable from KES 901, thus retaining the integrity provided by private blockchain system 109. On the other hand, in situations where KES 901 is unavailable or unreachable, public keys 107-1 and 107-2 may still be available from private blockchain system 109. As such, private blockchain system 109 and KES 901 may serve as fallbacks for each other, and the specific mode of retrieval (e.g., from private blockchain system 109 first with KES 901 as a fallback, or KES 901 first with private blockchain system 109 as a fallback) may be implemented based on factors or considerations such as security, amount of decentralization, trust (e.g., measure of trust of KES 901 and/or UEs 101 serving as nodes 111), speed of retrieval and/or validation, etc.

As further shown, UE 101-3 may share (at 1716) public key 107-3 (e.g., Public key C) to KES 901, as similarly described above. In some embodiments, KES 901 may share (at 1718) public key 107-3 to private blockchain system 109. In this manner, private blockchain system 109 may further maintain public key 107-3, even though public key 107-3 has not been received by private blockchain system 109 directly from UE 101-3 (e.g., in situations in which UE 101-3 does not support or implement APIs, applications, etc. via which UE 101-3 may interact with private blockchain system 109). In some embodiments, when sharing (at 1718) public key 107-3 to private blockchain system 109, KES 901 may include a digital signature that indicates the authenticity of public key 107-3 and/or of KES 901 (e.g., indicates that KES 901 is the entity that has recorded public key 107-3 to private blockchain system 109), and/or includes some other mechanism that indicates that public key 107-3 is valid. In this manner, UEs 101-1 and 101-2 may be able to obtain public key 107-3 from private blockchain system 109, without an initial attempt (e.g., as discussed above with respect to FIG. 16) to obtain public key 107-3 from private blockchain system 109 and a subsequent request for public key 107-3 from KES 901. In some embodiments, when obtaining public key 107-3 from private blockchain system 109 in this manner, UEs 101-1 and/or 101-2 may authenticate a signature of KES 901 and/or may otherwise validate public key 107-3.

Figure 18:
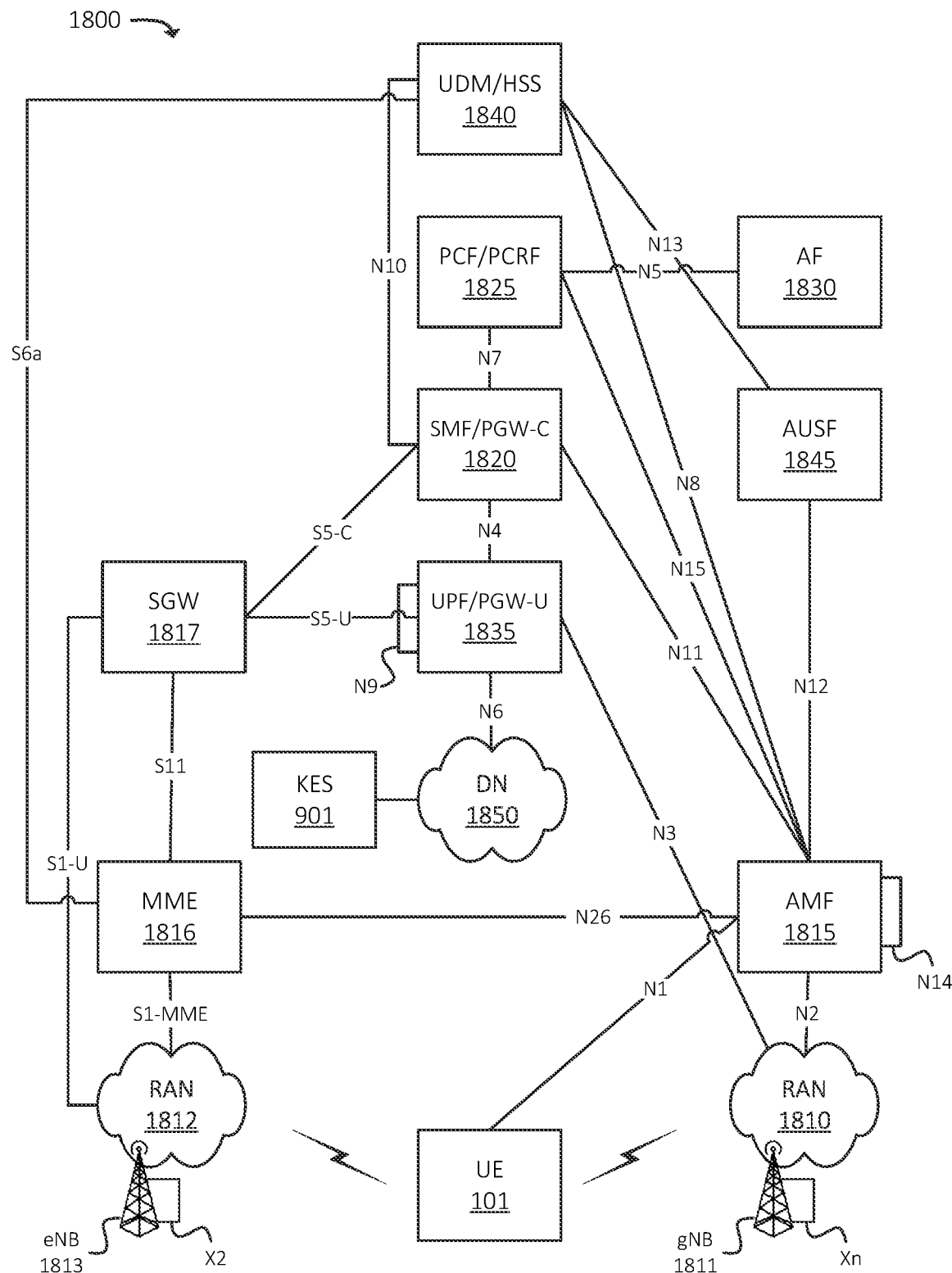
FIG. 18 illustrates an example environment in which one or more embodiments, described herein, may be implemented.

FIG. 18 illustrates an example environment 1800, in which one or more embodiments may be implemented. In some embodiments, environment 1800 may correspond to a Fifth Generation ("5G") network, and/or may include elements of a 5G network. In some embodiments, environment 1800 may correspond to a 5G Non-Standalone ("NSA") architecture, in which a 5G radio access technology ("RAT") may be used in conjunction with one or more other RATs (e.g., a Long-Term Evolution ("LTE") RAT), and/or in which elements of a 5G core network may be implemented by, may be communicatively coupled with, and/or may include elements of another type of core network (e.g., an evolved packet core ("EPC")). As shown, environment 1800 may include UE 101, RAN 1810 (which may include one or more Next Generation Node Bs ("gNBs") 1811), RAN 1812 (which may include one or more evolved Node Bs ("eNBs") 1813), and various network functions such as Access and Mobility Management Function ("AMF") 1815, Mobility Management Entity ("MME") 1816, Serving Gateway ("SGW") 1817, Session Management Function ("SMF")/Packet Data Network ("PDN") Gateway ("PGW")-Control plane function ("PGW-C") 1820, Policy Control Function ("PCF")/Policy Charging and Rules Function ("PCRF") 1825, Application Function ("AF") 1830, User Plane Function ("UPF")/PGW-User plane function ("PGW-U") 1835, Unified Data Management function ("UDM")/Home Subscriber Server ("HSS") 1840, Authentication Server Function ("AUSF") 1845, and KES 901. Environment 1800 may also include one or more networks, such as Data Network ("DN") 1850.

The example shown in FIG. 18 illustrates one instance of each network component or function (e.g., one instance of SMF/PGW-C 1820, PCF/PCRF 1825, UPF/PGW-U 1835, UDM/HSS 1840, and/or AUSF 1845). In practice, environment 1800 may include multiple instances of such components or functions. For example, in some embodiments, environment 1800 may include multiple "slices" of a core network, where each slice includes a discrete set of network functions (e.g., one slice may include a first instance of SMF/PGW-C 1820, PCF/PCRF 1825, UPF/PGW-U 1835, UDM/HSS 1840, and/or AUSF 1845, while another slice may include a second instance of SMF/PGW-C 1820, PCF/PCRF 1825, UPF/PGW-U 1835, UDM/HSS 1840, and/or AUSF 1845). The different slices may provide differentiated levels of service, such as service in accordance with different Quality of Service ("QoS") parameters.

The quantity of devices and/or networks, illustrated in FIG. 18, is provided for explanatory purposes only. In practice, environment 1800 may include additional devices and/or networks, fewer devices and/or networks, different devices and/or networks, or differently arranged devices and/or networks than illustrated in FIG. 18. For example, while not shown, environment 1800 may include devices that facilitate or enable communication between various components shown in environment 1800, such as routers, modems, gateways, switches, hubs, etc. Alternatively, or additionally, one or more of the devices of environment 1800 may perform one or more network functions described as being performed by another one or more of the devices of environment 1800. Devices of environment 1800 may interconnect with each other and/or other devices via wired connections, wireless connections, or a combination of wired and wireless connections. In some implementations, one or more devices of environment 1800 may be physically integrated in, and/or may be physically attached to, one or more other devices of environment 1800.

UE 101 may include a computation and communication device, such as a wireless mobile communication device that is capable of communicating with RAN 1810, RAN 1812, and/or DN 1850. UE 101 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an IoT device (e.g., a sensor, a smart home appliance, or the like), a wearable device, an Internet of Things ("IoT") device, a Machine-to-Machine ("M2M") device, or another type of mobile computation and communication device. UE 101 may send traffic to and/or receive traffic (e.g., user plane traffic) from DN 1850 via RAN 1810, RAN 1812, and/or UPF/PGW-U 1835. In some embodiments, UE 101 may include, implement, etc. one or more nodes 111 of blockchain system 109 and/or KES 901, as discussed above.

RAN 1810 may be, or may include, a 5G RAN that includes one or more base stations (e.g., one or more gNBs 1811), via which UE 101 may communicate with one or more other elements of environment 1800. UE 101 may communicate with RAN 1810 via an air interface (e.g., as provided by gNB 1811). For instance, RAN 1810 may receive traffic (e.g., voice call traffic, data traffic, messaging traffic, signaling traffic, etc.) from UE 101 via the air interface, and may communicate the traffic to UPF/PGW-U 1835, and/or one or more other devices or networks. Similarly, RAN 1810 may receive traffic intended for UE 101 (e.g., from UPF/PGW-U 1835, AMF 1815, and/or one or more other devices or networks) and may communicate the traffic to UE 101 via the air interface.

RAN 1812 may be, or may include, a LTE RAN that includes one or more base stations (e.g., one or more eNBs 1813), via which UE 101 may communicate with one or more other elements of environment 1800. UE 101 may communicate with RAN 1812 via an air interface (e.g., as provided by eNB 1813). For instance, RAN 1810 may receive traffic (e.g., voice call traffic, data traffic, messaging traffic, signaling traffic, etc.) from UE 101 via the air interface, and may communicate the traffic to UPF/PGW-U 1835, and/or one or more other devices or networks. Similarly, RAN 1810 may receive traffic intended for UE 101 (e.g., from UPF/PGW-U 1835, SGW 1817, and/or one or more other devices or networks) and may communicate the traffic to UE 101 via the air interface.

AMF 1815 may include one or more devices, systems, Virtualized Network Functions ("VNFs"), etc., that perform operations to register UE 101 with the 5G network, to establish bearer channels associated with a session with UE 101, to hand off UE 101 from the 5G network to another network, to hand off UE 101 from the other network to the 5G network, manage mobility of UE 101 between RANs 1810 and/or gNBs 1811, and/or to perform other operations. In some embodiments, the 5G network may include multiple AMFs 1815, which communicate with each other via the N14 interface (denoted in FIG. 18 by the line marked "N14" originating and terminating at AMF 1815).

MME 1816 may include one or more devices, systems, VNFs, etc., that perform operations to register UE 101 with the EPC, to establish bearer channels associated with a session with UE 101, to hand off UE 101 from the EPC to another network, to hand off UE 101 from another network to the EPC, manage mobility of UE 101 between RANs 1812 and/or eNBs 1813, and/or to perform other operations.

SGW 1817 may include one or more devices, systems, VNFs, etc., that aggregate traffic received from one or more eNBs 1813 and send the aggregated traffic to an external network or device via UPF/PGW-U 1835. Additionally, SGW 1817 may aggregate traffic received from one or more UPF/PGW-Us 1835 and may send the aggregated traffic to one or more eNBs 1813. SGW 1817 may operate as an anchor for the user plane during inter-eNB handovers and as an anchor for mobility between different telecommunication networks or RANs (e.g., RANs 1810 and 1812).

SMF/PGW-C 1820 may include one or more devices, systems, VNFs, etc., that gather, process, store, and/or provide information in a manner described herein. SMF/PGW-C 1820 may, for example, facilitate the establishment of communication sessions on behalf of UE 101. In some embodiments, the establishment of communications sessions may be performed in accordance with one or more policies provided by PCF/PCRF 1825.

PCF/PCRF 1825 may include one or more devices, systems, VNFs, etc., that aggregate information to and from the 5G network and/or other sources. PCF/PCRF 1825 may receive information regarding policies and/or subscriptions from one or more sources, such as subscriber databases and/or from one or more users (such as, for example, an administrator associated with PCF/PCRF 1825).

AF 1830 may include one or more devices, systems, VNFs, etc., that receive, store, and/or provide information that may be used in determining parameters (e.g., quality of service parameters, charging parameters, or the like) for certain applications.

UPF/PGW-U 1835 may include one or more devices, systems, VNFs, etc., that receive, store, and/or provide data (e.g., user plane data). For example, UPF/PGW-U 1835 may receive user plane data (e.g., voice call traffic, data traffic, etc.), destined for UE 101, from DN 1850, and may forward the user plane data toward UE 101 (e.g., via RAN 1810, SMF/PGW-C 1820, and/or one or more other devices). In some embodiments, multiple UPFs 1835 may be deployed (e.g., in different geographical locations), and the delivery of content to UE 101 may be coordinated via the N9 interface (e.g., as denoted in FIG. 18 by the line marked "N9" originating and terminating at UPF/PGW-U 1835). Similarly, UPF/PGW-U 1835 may receive traffic from UE 101 (e.g., via RAN 1810, SMF/PGW-C 1820, and/or one or more other devices), and may forward the traffic toward DN 1850. In some embodiments, UPF/PGW-U 1835 may communicate (e.g., via the N4 interface) with SMF/PGW-C 1820, regarding user plane data processed by UPF/PGW-U 1835.

UDM/HSS 1840 and AUSF 1845 may include one or more devices, systems, VNFs, etc., that manage, update, and/or store, in one or more memory devices associated with AUSF 1845 and/or UDM/HSS 1840, profile information associated with a subscriber. AUSF 1845 and/or UDM/HSS 1840 may perform authentication, authorization, and/or accounting operations associated with the subscriber and/or a communication session with UE 101.

DN 1850 may include one or more wired and/or wireless networks. For example, DN 1850 may include an Internet Protocol ("IP")-based PDN, a wide area network ("WAN") such as the Internet, a private enterprise network, and/or one or more other networks. UE 101 may communicate, through DN 1850, with data servers, other UEs 101, and/or to other servers or applications that are coupled to DN 1850. DN 1850 may be connected to one or more other networks, such as a public switched telephone network ("PSTN"), a public land mobile network ("PLMN"), and/or another network. DN 1850 may be connected to one or more devices, such as content providers, applications, web servers, and/or other devices, with which UE 101 may communicate.

Figure 19:
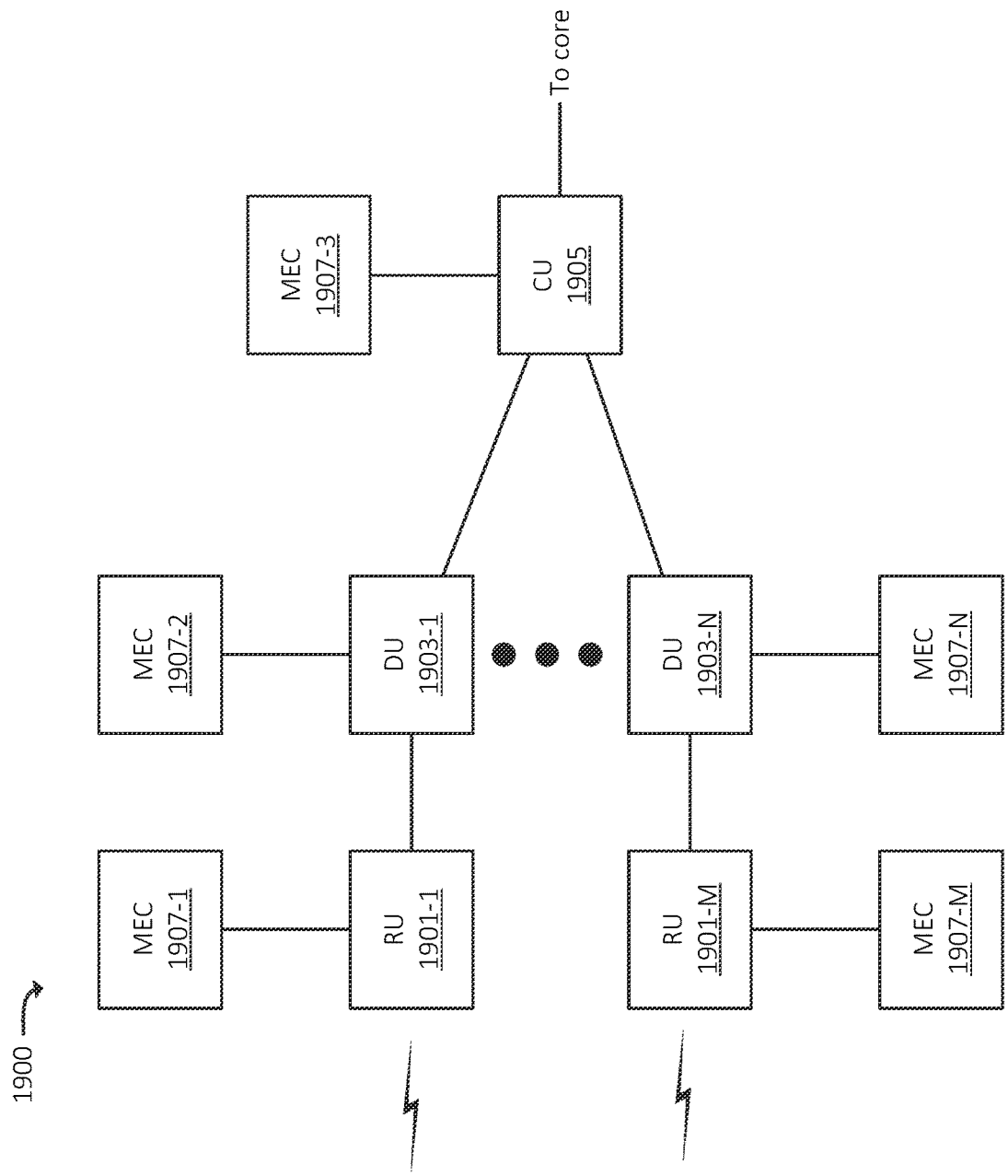
FIG. 19 illustrates an example arrangement of a radio access network ("RAN"), in accordance with some embodiments.

FIG. 19 illustrates an example Distributed Unit ("DU") network 1900, which may be included in and/or implemented by one or more RANs (e.g., RAN 1810, RAN 1812, or some other RAN). In some embodiments, a particular RAN may include one DU network 1900. In some embodiments, a particular RAN may include multiple DU networks 1900. In some embodiments, DU network 1900 may correspond to a particular gNB 1811 of a 5G RAN (e.g., RAN 1810). In some embodiments, DU network 1900 may correspond to multiple gNBs 1811. In some embodiments, DU network 1900 may correspond to one or more other types of base stations of one or more other types of RANs. As shown, DU network 1900 may include Centralized Unit ("CU") 1905, one or more Distributed Units ("DUs") 1903-1 through 1903-N (referred to individually as "DU 1903," or collectively as "DUs 1903"), and one or more Radio Units ("RUs") 1901-1 through 1901-M (referred to individually as "RU 1901," or collectively as "RUs 1901").

CU 1905 may communicate with a core of a wireless network (e.g., may communicate with one or more of the devices or systems described above with respect to FIG. 18, such as AMF 1815 and/or UPF/PGW-U 1835). In the uplink direction (e.g., for traffic from UEs 101 to a core network), CU 1905 may aggregate traffic from DUs 1903, and forward the aggregated traffic to the core network. In some embodiments, CU 1905 may receive traffic according to a given protocol (e.g., Radio Link Control ("RLC")) from DUs 1903, and may perform higher-layer processing (e.g., may aggregate/process RLC packets and generate Packet Data Convergence Protocol ("PDCP") packets based on the RLC packets) on the traffic received from DUs 1903.

In accordance with some embodiments, CU 1905 may receive downlink traffic (e.g., traffic from the core network) for a particular UE 101, and may determine which DU(s) 1903 should receive the downlink traffic. DU 1903 may include one or more devices that transmit traffic between a core network (e.g., via CU 1905) and UE 101 (e.g., via a respective RU 1901). DU 1903 may, for example, receive traffic from RU 1901 at a first layer (e.g., physical ("PHY") layer traffic, or lower PHY layer traffic), and may process/aggregate the traffic to a second layer (e.g., upper PHY and/or RLC). DU 1903 may receive traffic from CU 1905 at the second layer, may process the traffic to the first layer, and provide the processed traffic to a respective RU 1901 for transmission to UE 101.

RU 1901 may include hardware circuitry (e.g., one or more RF transceivers, antennas, radios, and/or other suitable hardware) to communicate wirelessly (e.g., via an RF interface) with one or more UEs 101, one or more other DUs 1903 (e.g., via RUs 1901 associated with DUs 1903), and/or any other suitable type of device. In the uplink direction, RU 1901 may receive traffic from UE 101 and/or another DU 1903 via the RF interface and may provide the traffic to DU 1903. In the downlink direction, RU 1901 may receive traffic from DU 1903, and may provide the traffic to UE 101 and/or another DU 1903.

RUs 1901 may, in some embodiments, be communicatively coupled to one or more Multi-Access/Mobile Edge Computing ("MEC") devices, referred to sometimes herein simply as "MECs" 1907. For example, RU 1901-1 may be communicatively coupled to MEC 1907-1, RU 1901-M may be communicatively coupled to MEC 1907-M, DU 1903-1 may be communicatively coupled to MEC 1907-2, DU 1903-N may be communicatively coupled to MEC 1907-N, CU 1905 may be communicatively coupled to MEC 1907-3, and so on. MECs 1907 may include hardware resources (e.g., configurable or provisionable hardware resources) that may be configured to provide services and/or otherwise process traffic to and/or from UE 101, via a respective RU 1901.

For example, RU 1901-1 may route some traffic, from UE 101, to MEC 1907-1 instead of to a core network (e.g., via DU 1903 and CU 1905). MEC 1907-1 may process the traffic, perform one or more computations based on the received traffic, and may provide traffic to UE 101 via RU 1901-1. In this manner, ultra-low latency services may be provided to UE 101, as traffic does not need to traverse DU 1903, CU 1905, and an intervening backhaul network between DU network 1900 and the core network. In some embodiments, MEC 1907 may include, and/or may implement, some or all of the functionality described above with respect to one or more nodes 111 and/or KES 901.

Figure 20:
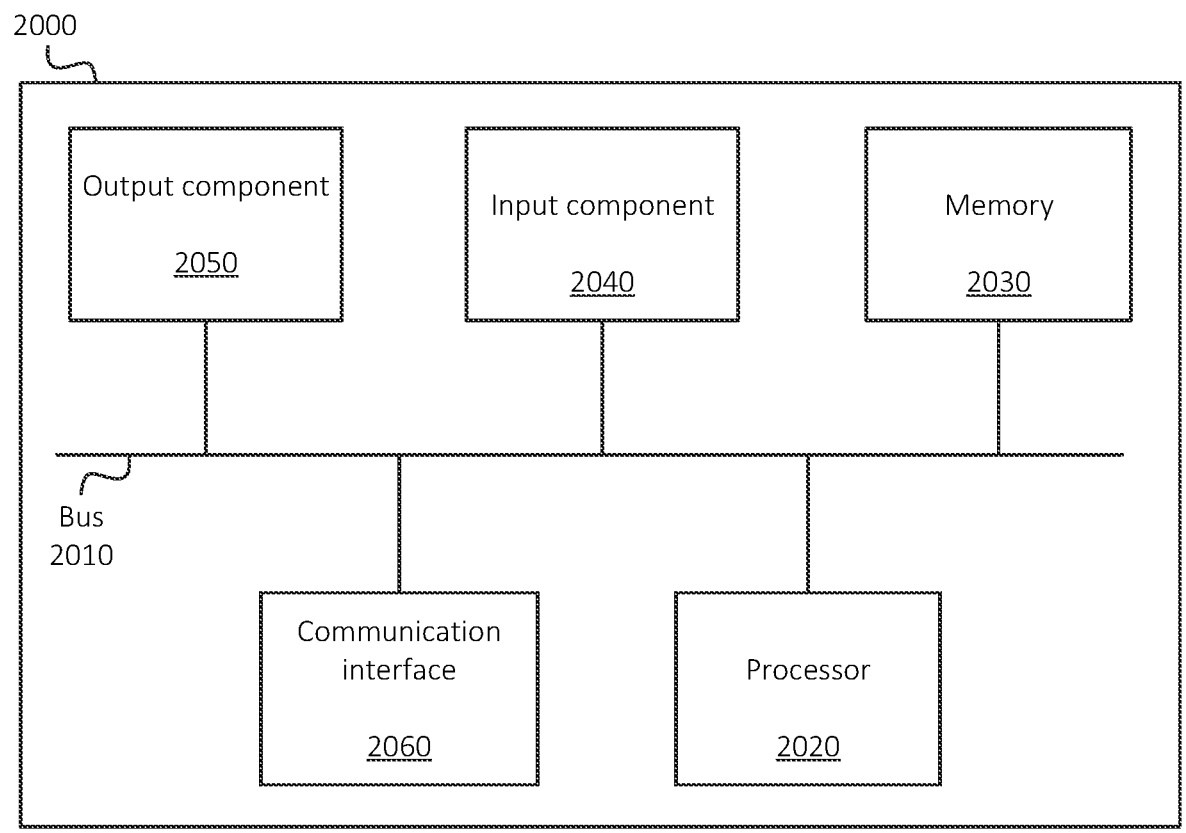
FIG. 20 illustrates example components of one or more devices, in accordance with one or more embodiments described herein.

FIG. 20 illustrates example components of device 2000. One or more of the devices described above may include one or more devices 2000. Device 2000 may include bus 2010, processor 2020, memory 2030, input component 2040, output component 2050, and communication interface 2060. In another implementation, device 2000 may include additional, fewer, different, or differently arranged components.

Bus 2010 may include one or more communication paths that permit communication among the components of device 2000. Processor 2020 may include a processor, microprocessor, or processing logic that may interpret and execute instructions. In some embodiments, processor 2020 may be or may include one or more hardware processors. Memory 2030 may include any type of dynamic storage device that may store information and instructions for execution by processor 2020, and/or any type of non-volatile storage device that may store information for use by processor 2020.

Input component 2040 may include a mechanism that permits an operator to input information to device 2000 and/or other receives or detects input from a source external to 2040, such as a touchpad, a touchscreen, a keyboard, a keypad, a button, a switch, a microphone or other audio input component, etc. In some embodiments, input component 2040 may include, or may be communicatively coupled to, one or more sensors, such as a motion sensor (e.g., which may be or may include a gyroscope, accelerometer, or the like), a location sensor (e.g., a Global Positioning System ("GPS")-based location sensor or some other suitable type of location sensor or location determination component), a thermometer, a barometer, and/or some other type of sensor. Output component 2050 may include a mechanism that outputs information to the operator, such as a display, a speaker, one or more light emitting diodes ("LEDs"), etc.

Communication interface 2060 may include any transceiver-like mechanism that enables device 2000 to communicate with other devices and/or systems. For example, communication interface 2060 may include an Ethernet interface, an optical interface, a coaxial interface, or the like. Communication interface 2060 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 2000 may include more than one communication interface 2060. For instance, device 2000 may include an optical interface and an Ethernet interface.

Device 2000 may perform certain operations relating to one or more processes described above. Device 2000 may perform these operations in response to processor 2020 executing software instructions stored in a computer-readable medium, such as memory 2030. A computer-readable medium may be defined as a non-transitory memory device. A memory device may include space within a single physical memory device or spread across multiple physical memory devices. The software instructions may be read into memory 2030 from another computer-readable medium or from another device. The software instructions stored in memory 2030 may cause processor 2020 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1-17), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A first device, comprising:
one or more hardware processors configured to:
receive an encrypted communication from a second device, the encrypted communication being associated with a first key, wherein the encrypted communication is associated with a particular identifier;
attempt to obtain, based on the particular identifier, the first key from a blockchain, wherein attempting to obtain the first key from the blockchain includes identifying a particular block of the blockchain that includes the particular identifier and that further specifies a second key;
perform a cross-validation of the second key with at least a threshold quantity of nodes of the blockchain in order to validate the second key as being the first key;
determine, based on performing the cross-validation, that at least the threshold quantity of nodes of the blockchain did not validate the second key as being the first key;
determine, based on determining that the at least the threshold quantity of nodes of the blockchain did not validate the second key as being the first key, that the attempt to obtain the first key from the blockchain was unsuccessful;
request, based on determining that the attempt to obtain the first key from the blockchain was unsuccessful, the first key from a third device, wherein the third device obtains the first key from the second device;
receive the first key from the third device; and
use the first key, as received from the third device, to decrypt the encrypted communication from the second device.

2. The first device of claim 1,
wherein the encrypted communication is associated with a group communication session associated with the first device, the second device, and a fourth device,
wherein the particular identifier is a first identifier, wherein the encrypted communication is a first encrypted communication, wherein the first device is further configured to:
receive a second encrypted communication from the fourth device, the second encrypted communication being associated with a third key;
obtain the third key from the blockchain; and
use the third key to decrypt the second encrypted communication from the fourth device.

3. The first device of claim 1, wherein the encrypted communication is associated with a group communication session associated with the first device, the second device, and a fourth device,
wherein the fourth device is configured to establish the blockchain based on an initiation of a communication session associated with the first, second, and fourth devices, wherein establishing the blockchain includes indicating the establishment of the blockchain to the first and second devices,
wherein the second device provides the first key to the third device based on receiving the indication of the establishment of the blockchain.

4. The first device of claim 3, wherein the second device provides the first key to the third device further based on at least one of:
determining that the second device does not support recording information to the blockchain, or
receiving an indication from a user of the second device not to join the blockchain.

5. The first device of claim 1, wherein the third device includes a Key Escrow System.

6. The first device of claim 1, wherein determining that at least the threshold quantity of nodes of the blockchain did not cross-validate the first key includes determining that at least the threshold quantity of nodes did not cross-validate the first key within a threshold amount of time.

7. The first device of claim 1, wherein the third device records the first key to the blockchain after receiving the first key from the second device.

8. A non-transitory computer-readable medium, storing a plurality of processor-executable instructions, wherein execution of the processor-executable instructions by a first device causes the first device to:
receive an encrypted communication from a second device, the encrypted communication being associated with a first key, wherein the encrypted communication is associated with a particular identifier;
attempt to obtain, based on the particular identifier, the first key from a blockchain, wherein attempting to obtain the first key from the blockchain includes identifying a particular block of the blockchain that includes the particular identifier and that further specifies a second key;
perform a cross-validation of the second key with at least a threshold quantity of nodes of the blockchain in order to validate the second key as being the first key:
determine, based on performing the cross-validation, that at least the threshold quantity of nodes of the blockchain did not validate the second key as being the first key;
determine, based on determining that the at least the threshold quantity of nodes of the blockchain did not validate the second key as being the first key, that the attempt to obtain the first key from the blockchain was unsuccessful;
request, based on determining that the attempt to obtain the first key from the blockchain was unsuccessful, the first key from a third device, wherein the third device obtains the first key from the second device;
receive the first key from the third device; and
use the first key, as received from the third device, to decrypt the encrypted communication from the second device.

9. The non-transitory computer-readable medium of claim 8,
wherein the encrypted communication is associated with a group communication session associated with the first device, the second device, and a fourth device,
wherein the particular identifier is a first identifier, wherein the encrypted communication is a first encrypted communication, wherein the plurality of processor-executable instructions further include processor-executable instructions to:

receive a second encrypted communication from the fourth device, the second encrypted communication being associated with a third key;

obtain the third key from the blockchain; and use the third key to decrypt the second encrypted communication from the fourth device.

10. The non-transitory computer-readable medium of claim 8, wherein the encrypted communication is associated with a group communication session associated with the first device, the second device, and a fourth device, wherein the fourth device is configured to establish the blockchain based on an initiation of a communication session associated with the first, second, and fourth devices, wherein establishing the blockchain includes indicating the establishment of the blockchain to the first and second devices, wherein the second device provides the first key to the third device based on receiving the indication of the establishment of the blockchain.

11. The non-transitory computer-readable medium of claim 10, wherein the second device provides the first key to the third device further based on at least one of:

determining that the second device does not support recording information to the blockchain, or receiving an indication from a user of the second device not to join the blockchain.

12. The non-transitory computer-readable medium of claim 8, wherein the third device includes a Key Escrow System.

13. The non-transitory computer-readable medium of claim 8, wherein determining that at least the threshold quantity of nodes of the blockchain did not cross-validate the first key includes determining that at least the threshold quantity of nodes did not cross-validate the first key within a threshold amount of time.

14. The non-transitory computer-readable medium of claim 8, wherein the third device records the first key to the blockchain after receiving the first key from the second device.

15. A method, comprising:

receiving, by a first device, an encrypted communication from a second device, the encrypted communication being associated with a first key, wherein the encrypted communication is associated with a particular identifier;

attempting to obtain, based on the particular identifier, the first key from a blockchain, wherein attempting to obtain the first key from the blockchain includes identifying a particular block of the blockchain that includes the particular identifier and that further specifies a second key;

performing a cross-validation of the second key with at least a threshold quantity of nodes of the blockchain in order to validate the second key as being the first key;

determining, based on performing the cross-validation, that at least the threshold quantity of nodes of the blockchain did not validate the second key as being the first key;

determining, based on determining that the at least the threshold quantity of nodes of the blockchain did not validate the second key as being the first key, that the attempt to obtain the first key from the blockchain was unsuccessful;

requesting, based on determining that the attempt to obtain the first key from the blockchain was unsuccessful, the first key from a third device, wherein the third device obtains the first key from the second device;

receiving the first key from the third device; and using the first key, as received from the third device, to decrypt the encrypted communication from the second device.

16. The method of claim 15, wherein the encrypted communication is associated with a group communication session associated with the first device, the second device, and a fourth device, wherein the particular identifier is a first identifier, wherein the encrypted communication is a first encrypted communication, wherein the method further comprises:

receiving a second encrypted communication from the fourth device, the second encrypted communication being associated with a third key;

obtaining the third key from the blockchain; and using the third key to decrypt the second encrypted communication from the fourth device.

17. The method of claim 15, wherein the encrypted communication is associated with a group communication session associated with the first device, the second device, and a fourth device, wherein the fourth device is configured to establish the blockchain based on an initiation of a communication session associated with the first, second, and fourth devices, wherein establishing the blockchain includes indicating the establishment of the blockchain to the first and second devices, wherein the second device provides the first key to the third device based on receiving the indication of the establishment of the blockchain, and further based on at least one of:

determining that the second device does not support recording information to the blockchain, or receiving an indication from a user of the second device not to join the blockchain.

18. The method of claim 15, wherein the third device includes a Key Escrow System.

19. The method of claim 15, wherein determining that at least the threshold quantity of nodes of the blockchain did not cross-validate the first key includes determining that at least the threshold quantity of nodes did not cross-validate the first key within a threshold amount of time.

20. The method of claim 15, wherein the third device records the first key to the blockchain after receiving the first key from the second device.

* * * * *